(12) United States Patent
Powell et al.

(10) Patent No.: US 10,887,188 B2
(45) Date of Patent: Jan. 5, 2021

(54) SYSTEM AND METHODS FOR DATA EVALUATION THROUGH NETWORK SENSITIVITY ANALYSIS

(71) Applicant: TensorDRO, Inc., Nashville, TN (US)

(72) Inventors: G Edward Powell, Nashville, TN (US); John M Clerici, Vienna, VA (US); Mark T Lane, Franklin, TN (US); Stephen C Bedard, Nashville, TN (US); N Edward White, Austin, TX (US)

(73) Assignee: TensorX, Inc., Nashville, TN (US)

( * ) Notice: Subject to any disclaimer, the term of this patent is extended or adjusted under 35 U.S.C. 154(b) by 0 days.

(21) Appl. No.: 16/781,653

(22) Filed: Feb. 4, 2020

(65) Prior Publication Data

US 2020/0252301 A1  Aug. 6, 2020

Related U.S. Application Data

(63) Continuation of application No. 16/268,516, filed on Feb. 6, 2019, now Pat. No. 10,567,237, which is a
(Continued)

(51) Int. Cl.
| | |
|---|---|
| *H04L 12/24* | (2006.01) |
| *G06F 16/906* | (2019.01) |
| *G06N 20/00* | (2019.01) |
| *G06N 3/08* | (2006.01) |
| *G06N 20/10* | (2019.01) |
| *G06N 20/20* | (2019.01) |

(Continued)

(52) U.S. Cl.
CPC .......... *H04L 41/16* (2013.01); *G06F 16/906* (2019.01); *G06N 3/084* (2013.01); *G06N 20/00* (2019.01); *H04L 41/14* (2013.01); *G06F 5/01* (2013.01); *G06F 17/16* (2013.01); *G06N 3/0481* (2013.01); *G06N 3/126* (2013.01); *G06N 20/10* (2019.01); *G06N 20/20* (2019.01)

(58) Field of Classification Search
CPC ......... H04L 41/14; H04L 41/16; G06F 17/16; G06F 5/01; G06F 16/906; G06N 20/00; G06N 20/10; G06N 20/20; G06N 3/0481; G06N 3/126; G06N 3/084
USPC .............................................. 706/12, 19, 20
See application file for complete search history.

(56) References Cited

U.S. PATENT DOCUMENTS

| | | | |
|---|---|---|---|
| 2013/0144584 A1* | 6/2013 | Chen ..................... | G16C 20/30 703/11 |
| 2014/0212901 A1* | 7/2014 | Lowery, Jr. ........ | A61B 5/02007 435/13 |

\* cited by examiner

*Primary Examiner* — Shane D Woolwine

(57) ABSTRACT

A method for evaluating a relative contribution of a first group of J data sets in a collection of N data sets, wherein N>J, includes first applying the collection of N data sets and second applying the first group of J data sets to a model and generating one or more observations O on the collection of N data sets and the first group of J data sets, including generating a N NSA curve comprising computing, using the model, an observation $O_N$ on the collection of N data sets; and generating a N–J NSA curve for the first group of J data sets by removing the first group of J data sets from the collection of N data sets, and generating, using the model, an observation $O_{N-J}$ with the first group of J data sets removed. The method then includes generating a measure $M_J$ of contributions of the group of J data sets based on the N NSA curve and the N–J NSA curves.

19 Claims, 18 Drawing Sheets

Related U.S. Application Data continuation of application No. 16/268,508, filed on Feb. 6, 2019.

(51) Int. Cl.
*G06F 5/01* (2006.01)
*G06F 17/16* (2006.01)
*G06N 3/04* (2006.01)
*G06N 3/12* (2006.01)

190

```
IF (r < 0.99*p AND µ < 4) THEN
        THE LEARNING RATE CAN BE INCREASED, SO:
                µ = 1.03*µ.
                        RESTART THE ERROR DECREASE COUNT TO 0
                        RESTART THE ERROR INCREASE COUNT TO 0
                        RESTORE THE MOMENTUM PARAMETER α
ELSE IF (r < p) THEN
        INCREMENT THE ERROR DECREASE COUNT BY 1
        RESTART THE ERROR INCREASE COUNT TO 0
        RESTORE THE MOMENTUM PARAMETER
        IF (ERROR DECREASE COUNT >= 10 AND µ < 4) THEN
                µ = 1.03*µ.
                        RESTART THE ERROR DECREASE COUNT TO 0
        END IF
ELSE IF (r > 1.03*p) THEN
        THE LEARNING RATE SHOULD BE DECREASED, SO:
                µ = 0.70*µ.
                        RESTART THE ERROR DECREASE COUNT TO 0
                        RESTART THE ERROR INCREASE COUNT TO 0
                        SET THE MOMENTUM PARAMETER α = 0
ELSE IF (r > p) THEN
        INCREMENT THE ERROR INCREASE COUNT BY 1
        RESTART THE ERROR DECREASE COUNT TO 0
        IF (ERROR DECREASE COUNT > = 5) THEN
                µ = 0.90*µ.
                        RESTART THE ERROR INCREASE COUNT TO 0
        END IF
ELSE
        NO CHANGE IS MADE TO µ.
        END IF
        SET p = r FOR THE NEXT CYCLE.
```

*FIG. 5A*

NSA GRAPH OF CONDITIONAL PROBABILITY FROM PROVIDER SPECIALTY

NSA GRAPH OF TOTAL NUMBER OF PROCEDURES PERFORMED

NSA GRAPH OF CONDITIONAL PROBABILITY FROM NUMBER OF VISITS SEEN

NSA GRAPH OF CONDITIONAL PROBABILITY FROM PROVIDER SPECIALTY

NSA GRAPH OF TOTAL NUMBER OF PROCEDURES PERFORMED.

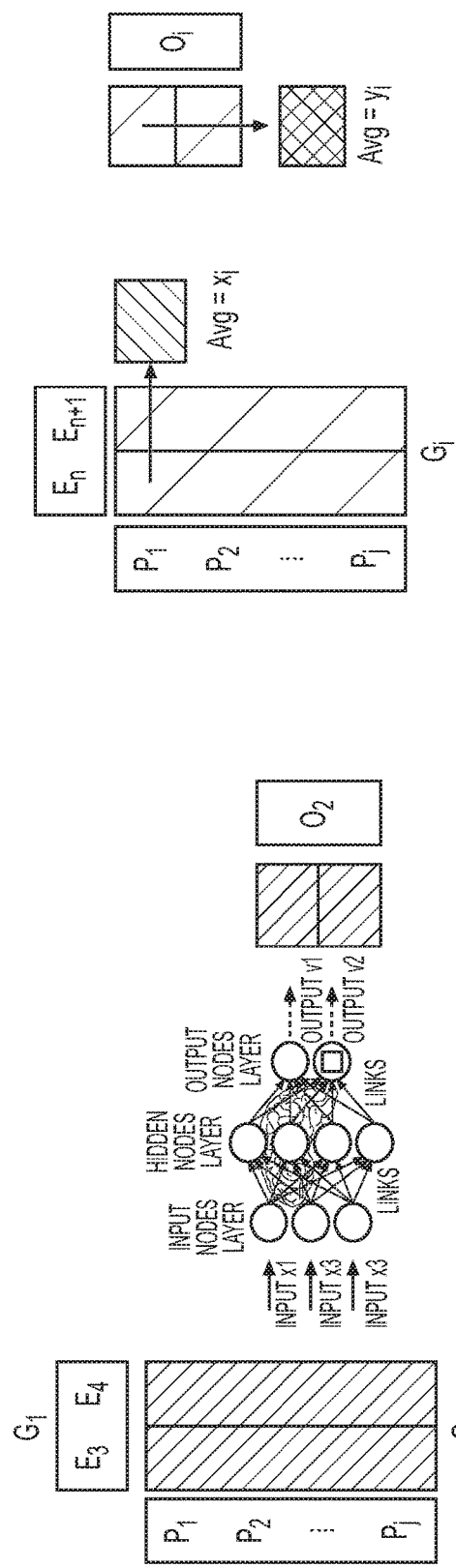
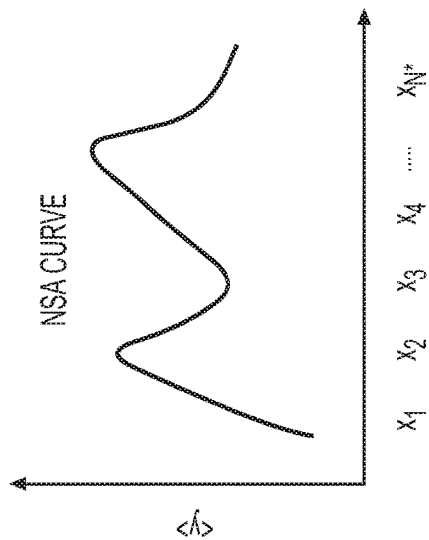
FIG. 11E
FIG. 11F
FIG. 11G

SYSTEM AND METHODS FOR DATA EVALUATION THROUGH NETWORK SENSITIVITY ANALYSIS

RELATED APPLICATIONS

This application is a continuation U.S. patent application Ser. No. 16/268,516, filed on Feb. 6, 2019 and entitled "System and Methods for Data Evaluation through Network Sensitivity Analysis," which is a continuation of U.S. patent application Ser. No. 16/268,508, filed on Feb. 6, 2019 and entitled "System and Methods for Network Sensitivity Analysis." The disclosures of these prior applications are incorporated herein by reference.

BACKGROUND

Improvements in computing power have led to a marked increase in the ability of a computing system to process large data sets. In addition, computing power improvements now allow more accurate data analysis and the ability to detect and exploit trends hidden in the large data sets.

In addition to improved data processing, computing power improvements have led to advances in machine learning. In a typical scenario, a computing system is trained by processing incoming data through a model with the model designed to converge to a known solution. Once so trained, the model may be tested and may be applied to data sets for which a solution is not known.

Current machine training models include use of neural networks, logistic regression, and gradient descent, for example.

SUMMARY

A method for evaluating a relative contribution of a first group of J data sets in a collection of N data sets, wherein N>J, includes first applying the collection of N data sets and second applying the first group of J data sets to a model and generating one or more observations O on the collection of N data sets and the first group of J data sets, including generating a N NSA curve comprising computing, using the model, an observation $O_N$ on the collection of N data sets; and generating a N–J NSA curve for the first group of J data sets by removing the first group of J data sets from the collection of N data sets, and generating, using the model, an observation $O_{N-J}$ with the first group of J data sets removed. The method then includes generating a measure $M_J$ of contributions of the group of J data sets based on the N NSA curve and the N–J NSA curves.

A computer-implemented data evaluation method includes a processor receiving a plurality of data sets N, each of the data sets N including one or more parameters, applying the plurality of data sets N to a machine learning model and generating one or more observations on the plurality of data sets N; and executing a network sensitivity analysis (NSA). Executing the NSA includes generating a N NSA curve for each of a plurality k of distinct input parameters in the N data sets including computing an observation $O_N$ with the N data sets, and generating a N–j NSA curve for each of the plurality of k distinct input parameters. Generating a N–J NSA curve includes removing the $j^{th}$ data set from the N data sets; and computing an observation $O_{N-j}$ with the $j^{th}$ data set removed. Executing the NSA further includes determining a measure $M_j$ of a contribution of a $j^{th}$ data set based on a sum of differences between the k N NSA curves and the k N–j NSA curves; and computing a relative strength $S_j$ of each of the N data sets as a function of the measure $M_j$:

$$S_j = \frac{M_j}{\sum_{i=1}^{N} M_i}.$$

A non-transitory, computer-readable storage medium having encoded thereon machine instructions that when executed by a processor, cause the processor to receive a plurality of data sets N, each of the data sets N comprising one or more parameters; apply the plurality of data sets N to a machine learning model and generate one or more observations O on the plurality of data sets N; execute a network sensitivity analysis (NSA) in which the processor generates a N NSA curve for each of a plurality k of distinct input parameters in the N data sets by computing an observation $O_N$ with the N data sets, generates a N–j NSA curve for each of the plurality of k distinct input parameters in which the processor removes the $j^{th}$ data set from the N data sets; and computes an observation $O_{N-j}$ with the $j^{th}$ data set removed, determines a measure $M_j$ of a contribution of a $j^{th}$ data set based on a sum of differences between the k N NSA curves and the k N–j NSA curves; and computes a relative strength $S_j$ of each of the N data sets as a function of the measure $M_j$:

$$S_j = \frac{M_j}{\sum_{i=1}^{N} M_i}.$$

A method for evaluating the relative contribution of an individual data set $N_j$ in a plurality of data sets $N_{(i\ \ldots\ j\ \ldots\ n)}$ to a problem solution O, the data sets $N_{(i\ \ldots\ j\ \ldots\ n)}$ processed and applied to a machine learning model begins with a processor executing a network sensitivity analysis (NSA). Executing the NSA includes generating a N NSA curve for each of a plurality distinct input parameters in the data sets $N_{(i\ \ldots\ j\ \ldots\ n)}$ by computing a solution $O_N$ with all of the data sets $N_{(i\ \ldots\ j\ \ldots\ n)}$; generating a N–j NSA curve (i.e., a NSA curve with the $j^{th}$ data set removed from the N data sets) for each of the plurality of distinct input parameters by removing the $j^{th}$ data set from the data sets $N_{(i\ \ldots\ j\ \ldots\ n)}$, and computing a solution $O_{N-j}$ with the $j^{th}$ data set removed. Finally, executing the NSA involves determining a measure $M_j$ of a contribution of a $j^{th}$ data set based on a difference between the N NSA curves and the N–j NSA curves, and computing a relative strength $S_j$ of each of the $N_{(i\ \ldots\ n)}$ data sets as a function of the measure $M_j$:

$$S_j = \frac{M_j}{\sum_{i=1}^{N} M_i}.$$

A method for evaluating relative contributions of data sets N to a problem solution O using a machine learning model includes a processor executing a network sensitivity analysis (NSA), which in turn includes generating a N NSA curve for each distinct input parameter $P_k$ in the data sets N, which in turn includes computing $O_N$ for each of the parameters $P_k$ in all of the data sets N by transforming the data sets N into ranked data sets for each of the distinct input parameters $P_k$. The transforming includes sorting the data sets N according to values of the distinct input parameters $P_k$, and based on the sorting, grouping the data sets into sub-groups $G_i$. For each sub-group $G_i$, the processor generates an average parameter $P_{kave}$ of the input parameters $P_k$ in the sub-group $G_i$, and generates a N–$G_j$ NSA curve for each of the average parameters $P_{kave}$ of the distinct input parameters $P_k$ by removing the sub-group $G_i$ and generating a solution $O_{N-i}$ with the sub-group $G_i$ removed. The method then includes determining a measure $M_i$ of a contribution of the sub-group $G_i$ based on a difference between the N NSA curves and the N–$G_i$ NSA curves.

DESCRIPTION OF THE DRAWINGS

The detailed description refers to the following figures in which like numerals refer to like items, and in which:

FIG. 5A illustrates an example algorithm for adapting the learning rate of the model of FIG. 4B;

FIGS. 11A-11G provide a pictorial description of an example process that generates NSA curves.

DETAILED DESCRIPTION

Figure 1:
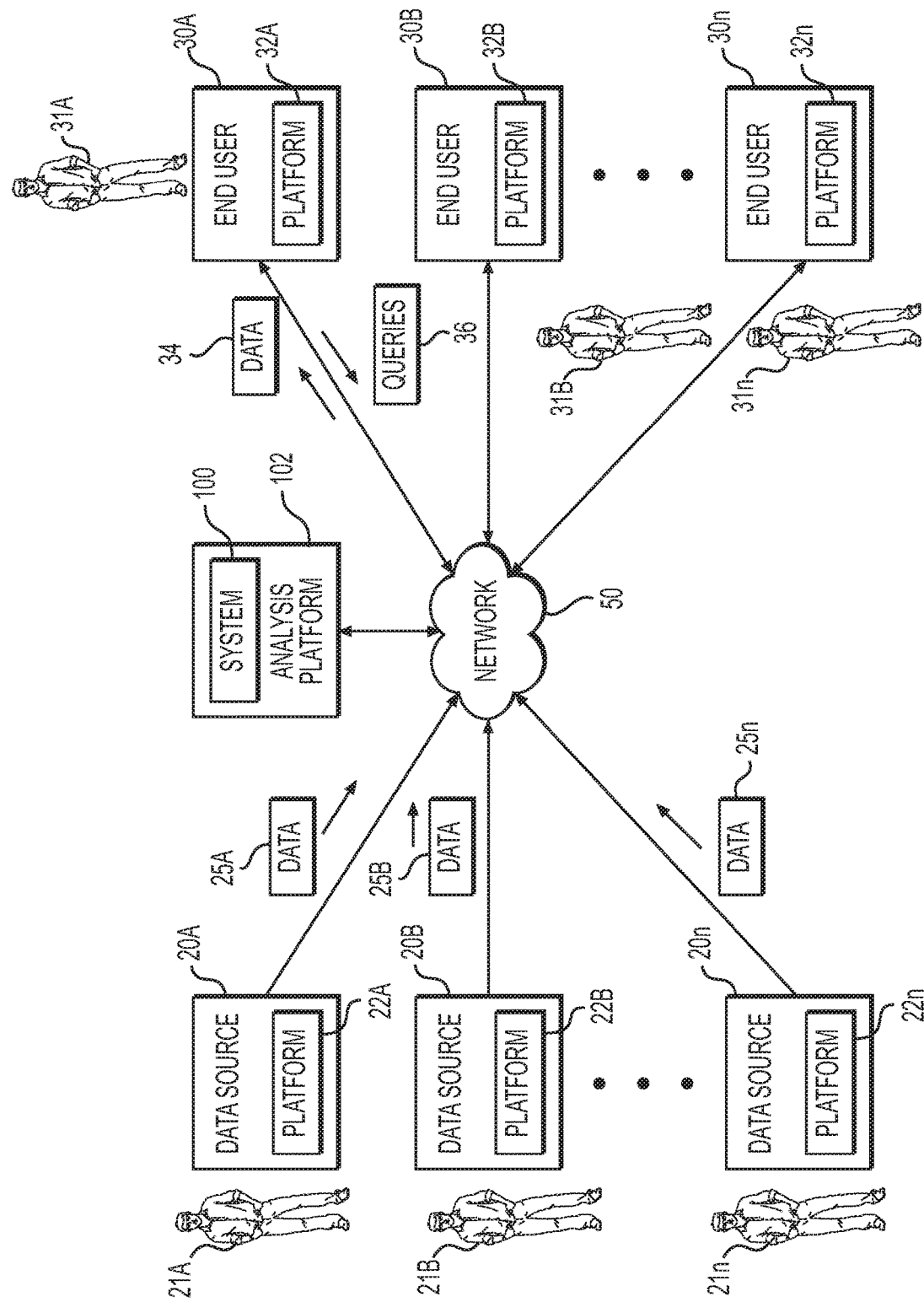
FIG. 1 illustrates an environment in which an example system for data evaluation through network sensitivity analysis operates.

Machine learning may be used to help humans to understand the structure of data and fit that data into models that also can be understood and used by humans. Machine learning algorithms differ from traditional computer algorithms in that machine learning algorithms allow computers to train on data inputs and use statistical analysis to output values that fall within a specific range. Machine learning allows computers to build models from sample data in order to automate decision-making processes based on data inputs. Machine learning methods generally consist of supervised learning and/or unsupervised learning. Supervised learning trains models using algorithms based on example input and output data that is labeled by humans, and unsupervised learning provides the algorithm with no labeled data in order to allow it to find structure within its input data. Common machine learning algorithmic approaches include genetic algorithms, logistic regression, gradient descent algorithms, the k-nearest neighbor algorithm, decision tree learning, and deep learning. As one skilled in the art will appreciate regarding the instant specification, one or all of the above-listed algorithms, and other algorithms, may be used with the herein disclosed inventive concepts. In supervised learning, the computer is provided with example inputs that are labeled with their desired outputs. The purpose of this method is for an algorithm to be able to "learn" by comparing its actual output with the "taught" outputs to find errors, and modify the model accordingly. Supervised learning therefore uses patterns to predict label values on additional unlabeled data. In unsupervised learning, data is unlabeled, so the learning algorithm is left to find commonalities among its input data. Because unlabeled data are more abundant than labeled data, machine learning methods that facilitate unsupervised learning are particularly valuable. The goal of unsupervised learning may be as straightforward as discovering hidden patterns within a data set, but it may also have a goal of feature learning, which allows the computational machine to automatically discover the representations that are needed to classify raw data. Unsupervised learning is commonly used for transactional data. Without being told a "correct" answer, unsupervised learning methods can look at complex data that is more expansive and seemingly unrelated in order to organize it in potentially meaningful ways. Unsupervised learning may be used for anomaly detection including for fraudulent credit card purchases, and recommender systems that recommend what products to buy next. The k-nearest neighbor algorithm is a pattern recognition model that can be used for classification as well as regression. Often abbreviated as k-NN, the k in k-nearest neighbor is a positive integer, which is typically small. In either classification or regression, the input will consist of the k closest training examples within a space. In this method, the output is class membership. This will assign a new object to the class most common among its k nearest neighbors. In the case of k=1, the object is assigned to the class of the single nearest neighbor. Among the most basic of machine learning algorithms, k-nearest neighbor is considered to be a type of "lazy learning" as generalization beyond the training data does not occur until a query is made to the system. For general use, decision trees are employed to visually represent decisions and show or inform decision making. When working with machine learning and data mining, decision trees are used as a predictive model. These models map observations about data to conclusions about the data's target value. The goal of decision tree learning is to create a model that will predict the value of a target based on input variables. In the predictive model, the data's attributes that are determined through observation are represented by the branches, while the conclusions about the data's target value are represented in the leaves. When "learning" a tree, the source data is divided into subsets based on an attribute value test, which is repeated on each of the derived subsets recursively. Once the subset at a node has the equivalent value as its target value has, the recursion process will be complete. Deep learning attempts to imitate how the human brain can process light and sound stimuli into vision and hearing. A deep learning architecture is inspired by biological neural networks and consists of multiple layers in an artificial neural network made up of hardware and GPUs. Deep learning uses a cascade of nonlinear processing unit layers in order to extract or transform features (or representations) of the data. The output of one layer serves as the input of the successive layer. In deep learning, algorithms can be either supervised and serve to classify data, or unsupervised and perform pattern analysis. Among the machine learning algorithms that are currently being used and developed, deep learning absorbs the most data and has been able to beat humans in some cognitive tasks.

Figure 2:
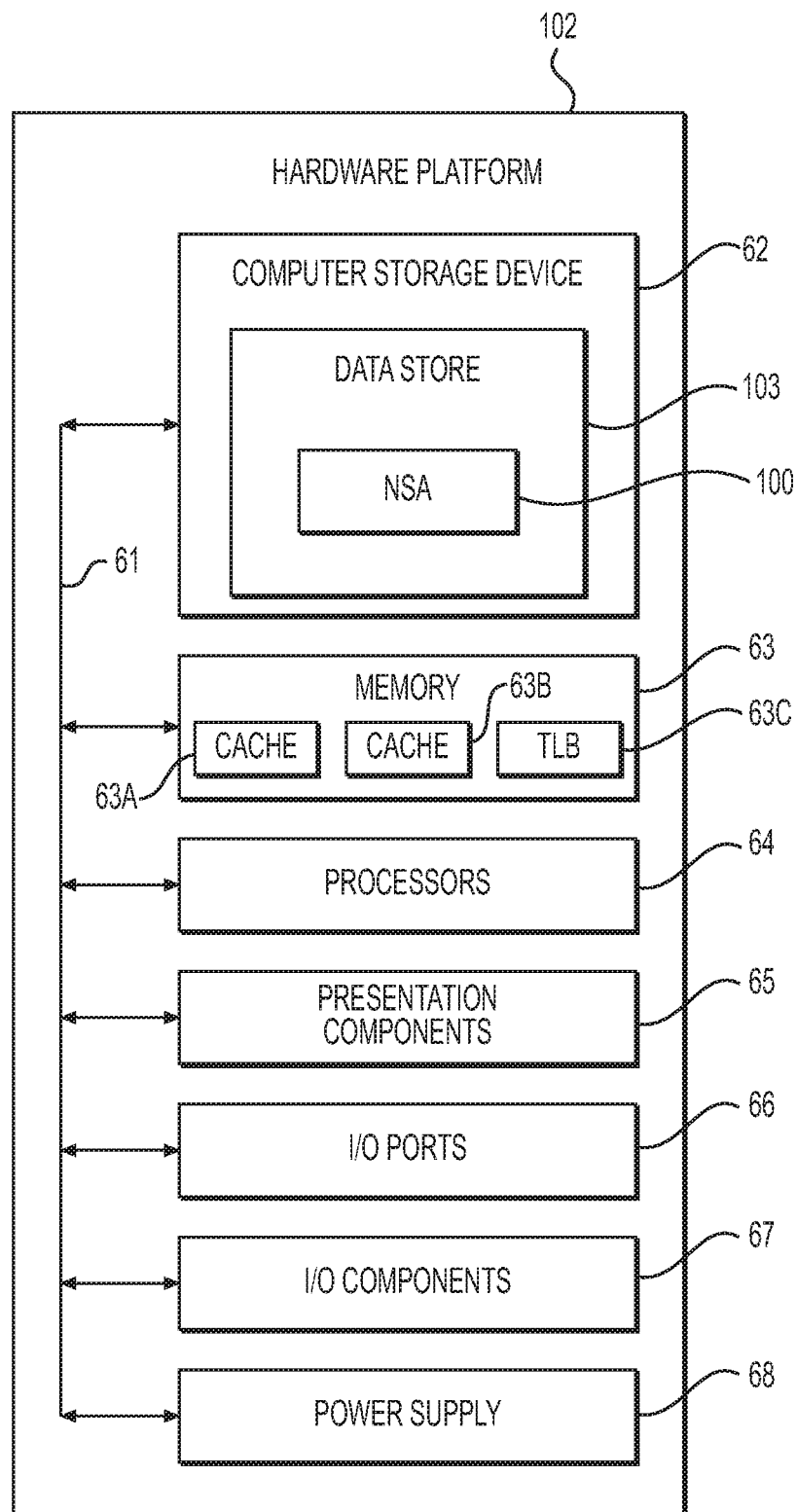
FIG. 2 illustrates an example specially-programmed hardware platform on which the example system for data evaluation through network sensitivity analysis may be implemented.
Figure 10:
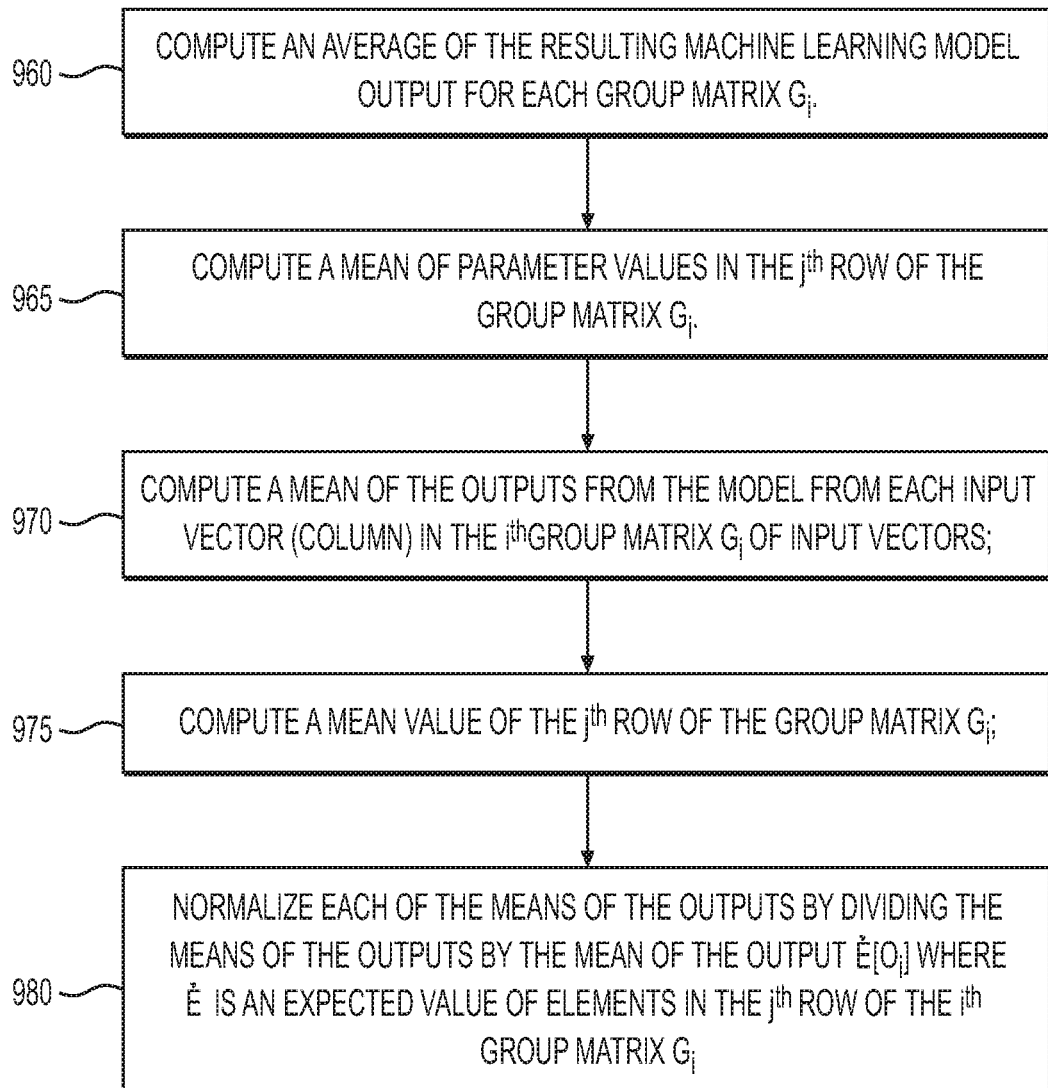

FIG. 1 illustrates an environment in which a system for data evaluation through network sensitivity analysis and corresponding methods may be implemented. In FIG. 10, environment 10 includes multiple data sources 20, system for data evaluation through network sensitivity analysis 100 (system 100) and one or more data end users 30. The data sources 20 each may include a hardware platform, such as platform 22. The end users 30 may include a hardware platform such as platform 32. The system 100 may be instantiated on analysis (hardware) platform 102. FIG. 2, described below, is a block diagram of platform 102; hardware platforms 22 and 32 may be similar in many respects to platform 102. The data sources 20, end users 30, and system 100 all may communicate over network 50. The data sources 20 provide data 25 to the system 100. The system 100 processes the received data and makes information related to the processed data available to end users 30. The data sources 20 include big data sources providing formatted and/or unformatted data, streaming data, and batch data. Other data sources 20 provide limited and targeted data to the system 100. In an aspect, the data sources 20 are machines operated at the direction of human users 21. In an aspect, the data end users 30 are machines operated by human users 31. The system 100 may be associated or affiliated with one or more data end users 30 or may be a stand alone system. When operated as a standalone system, the system 100 may be operated under the direction of human user.

The network 50 may be any communications network that allows the transmission of signals, media, messages, voice, and data among the entities shown in FIG. 1, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless. The network 50 may be all or a portion of an enterprise or secured network. In an example, the network 50 may be a virtual private network (VPN) between the streaming data sources 20 and a device 32 operated by the human user 31 across a wireline or a wireless link. While illustrated as a single or continuous network, the network 50 may be divided logically into various sub-nets or virtual networks, so long as at least a portion of the network 50 may facilitate communications among the entities of FIG. 1.

In an aspect, the human users 31 and data sources 20 all may be independent of each other. In another aspect, the data sources 20, for example, may belong to an organization, such as a business or government agency, and the human user 31 may work for, or otherwise be associated with the organization. In addition, end users 30 themselves may be data sources.

The human users 31 may desire to gain insights into data received at and processed by the system 100. In an aspect, one or more of the human users 21 may desire to gain recognition for the data 25 provided by their respective data sources 20. Thus, the human users 21 and 31 may cooperate in a process in which data 25 are supplied, insights are gleaned from the data 25, and an individual human user 21 (or the associated data source 20) providing the data 25 receives a measure of recognition based on the importance of the insights gleaned from the data 25 provided by the human user 21's data source.

The system 100 may be implemented on specially-programmed hardware platform 102. Such a platform is shown in FIG. 2. In FIG. 2, a server system includes bus 61 that directly or indirectly connects storage device 62, memory 63, processors 64, presentation components 65, input/output (I/O) ports 66, input/output components 67, and power supply 68. Bus 61 represents what may be one or more busses (such as an address bus, data bus, or combination thereof). Although the various blocks of FIG. 2 are shown with lines for the sake of clarity, in reality, delineating various components is not so clear; for example, one may consider a presentation component such as a display device to be an I/O component. Also, processors 64 have memory. Thus, the diagram of FIG. 2 is merely illustrative of an exemplary server system that may be used in connection with one or more embodiments of the herein disclosed inventions. Distinction is not made between such categories as "workstation," "server," "laptop," "hand-held device," etc., as all are contemplated within the scope of FIG. 2 and reference to a "server system." Storage device 62 may include a variety of non-transitory, computer-readable storage media. Such computer-readable storage media may be any available media that can be accessed by the processors 64. For example, the storage device 62 may include system 100 and its associated data store 103. Memory 63 includes computer-readable storage media in the form of volatile and/or nonvolatile memory. The memory 63 includes instruction cache 63A, data cache 63B, and translation lookaside buffer 63C. The caches 63A and 63B may include several cache levels. Alternately, these memory components may be resident on the processors 64. Operation of these memory components is well known to those skilled in the art. As disclosed herein, the system 100 may leverage these memory components to speed model updates and data outputs. The memory 63 may be removable, non-removable, or a combination thereof. Example memory devices include solid-state memory, hard drives, and optical-disc drives. The processors 64 read data from various entities such as storage device 62, memory 63 or I/O components 67. Presentation components 65 present data indications to a human user or to other computing systems. Example presentation components 65 include a display device, speaker, or printing component.

Figure 3:
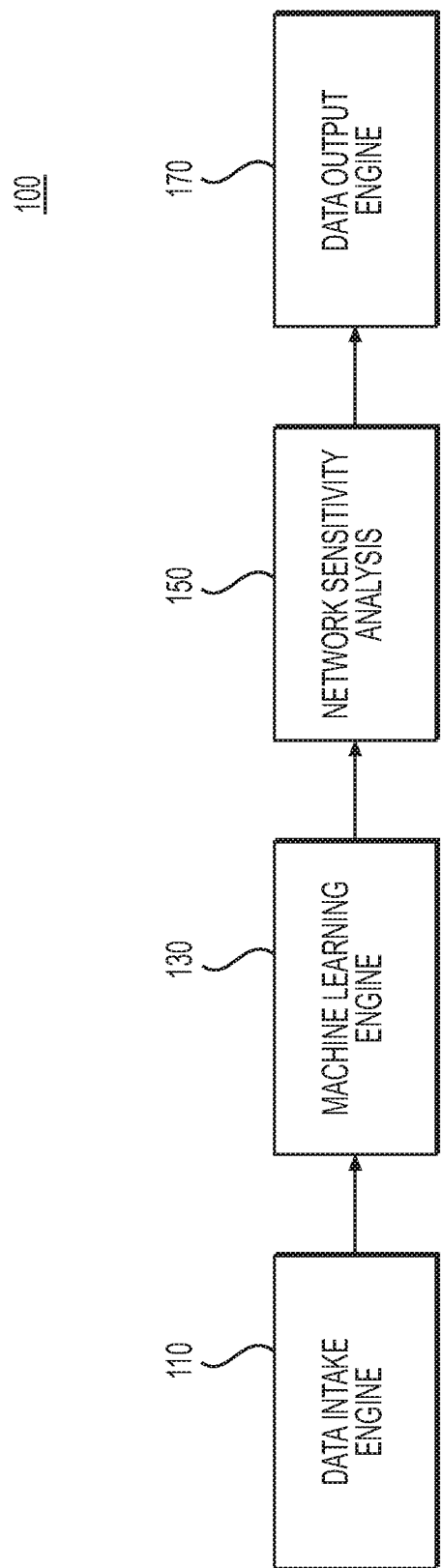
FIG. 3 is a block diagram of an example system for data evaluation through network sensitivity analysis as instantiated on the platform of FIG. 2.

FIG. 3 is a block diagram of example system 100 as instantiated in environment 10 on platform 102. The system 100 includes data intake and pre-processing engine 110, machine learning engine 130, network sensitivity analysis engine 150, and data output and recognition engine 170.

Figure 4A:
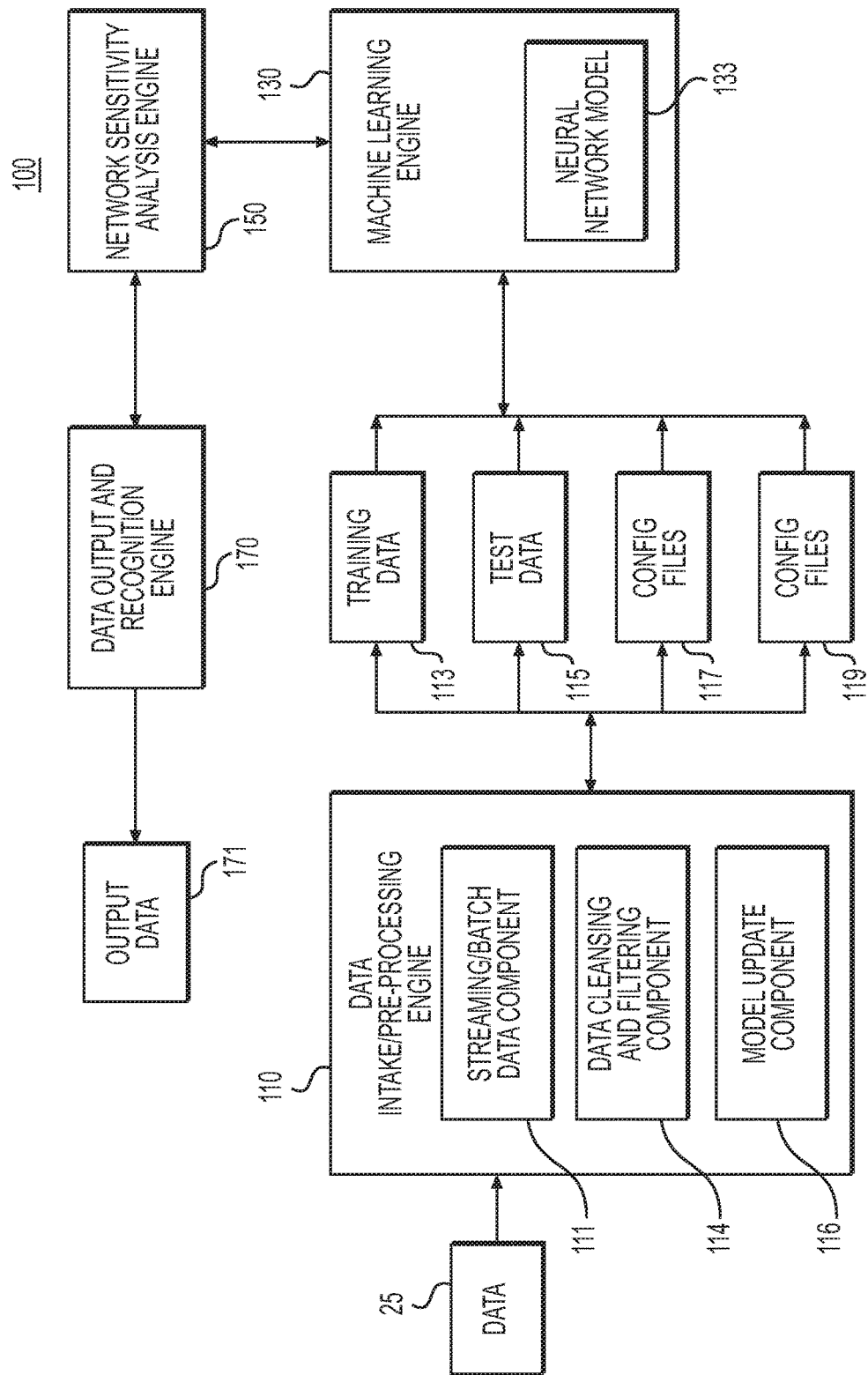
FIG. 4A illustrates the system of FIG. 3 in more detail.

FIG. 4A shows the system of FIG. 3 in more detail. The pre-processing engine 110 is used for data intake, data classification, and data conditioning. Data 25 received at the engine 110 from data sources 20 may be formatted, semi-formatted, or unformatted. The data 25 may be streaming data or batch data. The data 25 may be received continuously or nearly continuously, periodically, or episodically.

Thus, the engine 110 may combine both batch and streaming data processing. Data 25 may first be processed by streaming data component 111 to extract real-time insights, and then persisted into a data store 103 (see FIG. 2) where the stored data may be transformed and loaded for a variety of batch processing use cases. In general, batch processing may be used to compute arbitrary queries over different data sets. Batch processing results may enable deep analysis of big data sets. The engine 110 may use, for example, a MapReduce-based platform to support batch data processing. The engine 110 also may use the streaming data component 111 to ingest a sequence of data, and incrementally update metrics, reports, and summary statistics in response to the arriving streaming data. Processing steaming data provides for real-time response functions. Streaming data may be generated continuously by thousands of data sources (e.g., the data sources 20 of FIG. 1), which may send in data records simultaneously, but in small size records (e.g., on the order of Kilobytes). Streaming data may include data such as log files generated by customers using mobile or Web applications, ecommerce purchases, in-game player activity, information from social networks, or geospatial services, and telemetry from connected devices or instrumentation in data centers. The engine 110 may process streaming data sequentially and incrementally on a record-by-record basis or over sliding time windows. Information derived from analyzing such data may give businesses and organizations (e.g., at end users 30) a view into many aspects of their businesses or operations, as well as activity such as service usage (for metering/billing), server activity, website clicks, and geo-location of devices 32, human users 31, and physical goods. For example, businesses can follow changes in public sentiment on their brands and products by continuously analyzing social media streams, and respond in a timely fashion as the necessity arises. Streaming data processing may be beneficial in scenarios where new, dynamic data is generated on a continual basis. Streaming data processing applies to many industry segments and big data use cases. The engine 110 may perform streaming data processing using a storage layer and a processing layer. The storage layer supports data record ordering and consistency to enable fast, inexpensive, and replayable reads and writes of large streams of data. The processing layer consumes data from the storage layer, runs computations on that data, and then notifies the storage layer to delete data that no longer are needed.

The engine 110 also includes data conditioning module 114, which may execute to organize and/or configure data for use in a specific model, and to clean up faulty data. Many machine learning algorithms show poorer performance when instances in a data set are missing features or values, as compared to the same algorithm operating with a complete data set. In an aspect, the data conditioning module 114 may pre-process the input data 25 to replace a missing feature value with, for example, the median or the mean of all feature values that are present in the instance. This median value may be used during training and testing of the model. The same median value may be used when applying the model to a new data set in which instances are missing feature values. Of course, this process is relatively straightforward when the feature values are expressed as numbers but not so straightforward when the data set includes missing text entries. In this later situation, the module 114 may be configured to assign numerical values (e.g., 0 or 1) to a missing text value. Other data transforms such as scaling and normalizing feature values may improve the performance of selected algorithms.

The engine 110 outputs training data set 113, test data set 115, neural network confidence file 117, and neural network parameter file 119. The outputs 113, 115, 117, and 119 from engine 110 are input to the machine learning engine 130. In an aspect, the engine 130 is implemented as a neural network model (neural network model 133—see FIG. 4B), but other machine learning engines may be used, as one skilled in the art would appreciate.

Both the training data set 113 and the test data set 115 have parameters that are inputs to the model with known outputs. The training data set 113 is used to cause the machine learning engine 130 to fit the input to the known outputs. The test data set 115 is used to determine how well the engine 130 is able to generalize to input data that are not used to fit the engine parameters. A common problem with machine learning is "over-fitting," whereby the machine learning engine is only able to match the training data set 113 with a desired level of accuracy. The test data set 115 will allow the human user 31 to understand how well the fit model will work with inputs that were not used during the training. Once the human user 31 is satisfied with the results of the test data process, the engine 130 can be trusted to produce acceptable predictions from future inputs.

To address limitations of linear model predictions, the neural network model 133 may be a non-linear feed-forward supervised learning neural network model. One such model methodology is known as the resilient propagation algorithm, which is a modification of back-propagation. The feed-forward neural network model 133 employs the fitting of weights, but in addition applies a non-linear sigmoidal activation function to each weight to give the model 133 the ability to recognize patterns in a non-linear fashion (as also is the result from the use of the hidden layers). Note that other activation functions may be used in lieu of the sigmoidal activation function.

I Using vector and matrix notation (bold-faced lowercase letters are vectors and bold-faced uppercase letters are matrices), the mathematical encoding of the neural network model 133 with one hidden layer is described. In this model 133, i denotes the vector of input-layer neurons, h denotes the vector of hidden-layer neurons, and o denotes the vector of output-layer neurons for any instantiation of data that comprises one cycle through the neural network model 133. Furthermore, d is the dimension of i, q is the dimension of h, and n is the dimension of o. $W_1$ is a q by d matrix of weights to convert i into h. $W_2$ is a n by q matrix of weights to convert h into o. Finally, f(x), where x is a vector, denotes the application of a logistics (or activation) function f for every element in x. Then the neural network model 133 is formulated by the following system of mathematical equations:

$$h = f(W_1 i) \text{ and } o = f(W_2 h).$$

The training data 113 with target output t is employed to fit the matrices $W_1$ and $W_2$ so as to minimize the square of the sum of the errors |t−o| using the common $L_2$ vector norm. Each cycle of data is passed through the model 133, and the error is used to back-propagate through the system of equations to update the weight matrices. This process is repeated by cycling through all of the training data 113 until convergence is reached. Once the weight matrices are calculated in this fashion, the model 133 can predict output quantities o for inputs outside the training data. One such logistic function is:

$$\text{(a) } f(x) = \frac{1.5}{1 + e^{-x}}$$

$$\text{(b) } f(x) = \tan^{-1}(x)$$

$$\text{(c) } f(x) = \frac{1 - e^{-x}}{1 + e^{-x}}$$

$$\text{(d) } f(x) = \tanh(x) = \frac{e^x - e^{-x}}{e^x + e^{-x}}$$

The limit of this logistic function as x tends to negative infinity is 0 and is 1.5 as x tends to positive infinity. The logistic function's steepest slope is in the half-open interval of (0, 1). However, the logistic function may be of limited use when outputs from the neural network are to be negative. Other examples for possible logistic (or activation) functions include:

The limit of function (b) as x tends to negative infinity is $-\pi/2$ and is $\pi/2$ as x tends to positive infinity. Its steepest slope is in the interval of (−1, 1).

The limit of function (c) as x tends to negative infinity is −1 and is 1 as x tends to positive infinity. Its steepest slope is in the interval of (−1, 1).

The limit of function (d) as x tends to negative infinity is −1 and is 1 as x tends to positive infinity. Its steepest slope is in the interval of (−1, 1).

Each of the functions (b), (c), and (d) has the ability to support negative values. This obviates the need for additive adjustments to the data in order to force the values to be positive.

Figure 4B:
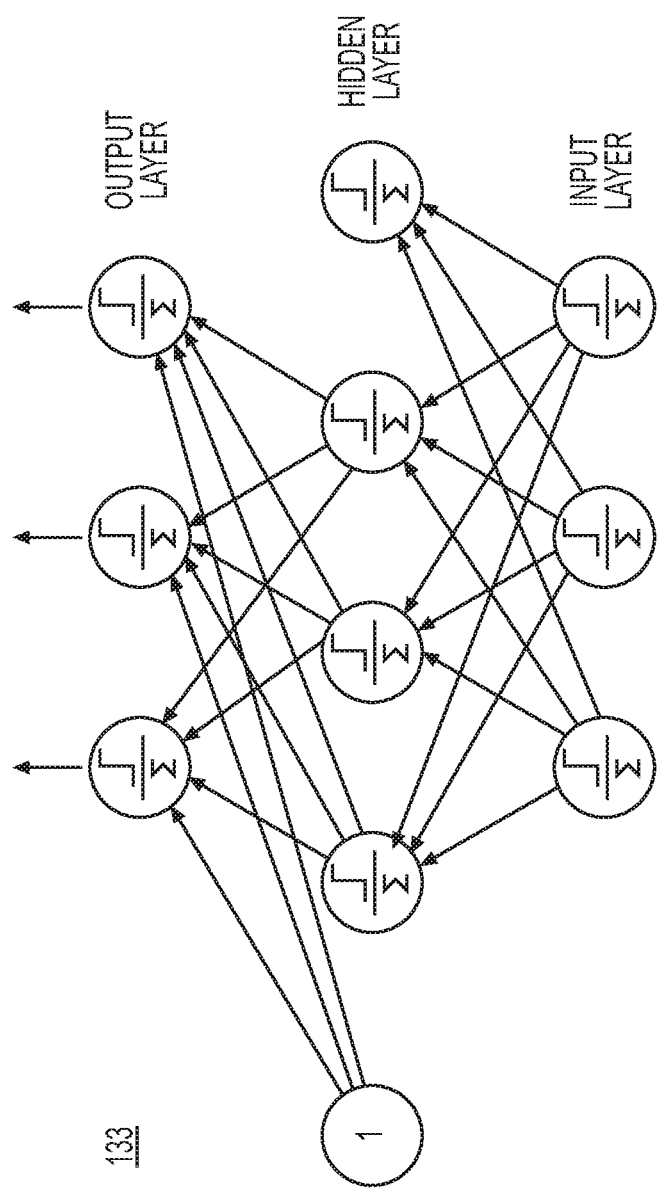
FIG. 4B illustrates an example neural network model implemented on the system of FIG. 3.

FIG. 4B illustrates an example neural network model. In FIG. 4B, model 133 includes an input layer, one or more hidden layers (only one hidden layer is shown), and an output layer. The model 133 may be trained using a back propagation algorithm, for example, or the previously mentioned resilient propagation algorithm.

Back propagation networks such as the model 133 use a supervised learning technique where truth data are known in a training interval, the model 133 is trained using the error function E over this training interval, and the trained network models data over the test interval where the truth data are not known. The error function E can be written as:

$$E = \tfrac{1}{2}\pi(t_\pi - o_\pi)^2$$

where $\pi$ is an index that runs over the training interval. Updates to the weights W during back propagation are governed by the equation:

$$\Delta W = -\mu \frac{\partial E}{\partial W}$$

where $\mu$ is the learning rate. If $\mu$ is small enough, the above equation approaches the gradient descent method. Since the error E is a sum, the partial derivative also is a sum. Batch-mode (or epoch) based learning refers to a technique whereby the partial derivative is evaluated over the entire sum over the training interval in a cycle before a single correction to the weight matrices is made. By contrast, on-line learning refers to the case where the weight matrices are updated after each pattern p in the training interval, without waiting for the calculation of the entire cycle. There are advantages and disadvantages to both techniques. Batch-mode learning is more in tune with gradient descent, but on-line learning may converge better because the weights are updated continuously throughout the cycle.

The system 100 may employ randomizing of the data in the cycle for feeding the training data set 113 to the neural network model 133. This prevents the time order of the training data from influencing the model 133 in the same way every cycle, and such data randomization may prevent the model 133 from being trapped into local minima or "ravines". Another benefit from randomizing the presentation of data from the training data set 113 is the possibility of reducing large biases that could result from the training data always being presented to the model 133 in the same order.

The system 100 may enhance the performance of the neural network model 133 through use of bias nodes and momentum. Bias nodes are artificial constructs in a neural network model that help to define a certain measure of balance to a classification scheme. Specifically, one node is added to all layers in the neural network model except the output layer, and the input to each of these additional nodes is set equal to 1. As the neural network model trains and learns the patterns of the training data set 113, bias nodes can help to separate the data into regions that are more easily classified. Bias nodes can be effective in many applications of a neural network. If {x} is the set of input data, with each x a vector of size n, then when bias nodes are used, the size of each x is increased to n+1, with $x_n=1$. Then the size of each hidden layer, h of size $q_j$, also is increased by one, with $h_{qj}=1$.

The momentum parameter may increase the convergence rate for the neural network model 133 as long as the momentum parameter is used in conjunction with a small learning rate $\mu$. The idea is to weigh the previous correction to the weight matrices, so that learning for each change in the weight matrices does not go down a path that is in a completely different direction. Using the momentum parameter, $\alpha$, the equation for correction of the weight matrices now becomes:

$$\Delta W(t) = -\mu \frac{\partial E}{\partial W} + \alpha \Delta W(t-1)$$

where $\alpha$ is the momentum parameter. There is direct relationship between the momentum parameter $\alpha$ and the learning rate parameter $\mu$, and generally when momentum is large, the learning rate should be small.

Momentum $\alpha$ and learning rate $\mu$ are hyper-parameters that can be input to the neural network model 133, but experience has shown that a large momentum is helpful in conjunction with a small learning rate. The momentum hyper-parameter amplifies the effective learning rate to $\mu'=\mu/(1-\alpha)$, so that large momentum values call for smaller learning rates, in general. Experience has shown that $\alpha=0.8$ and $\mu<0.2$ is best. Adaptive learning rate algorithms, disclosed herein, can lead to even smaller learning rates to keep a complex neural network model converging properly.

It is clear that the learning rate and momentum hyper-parameter settings have a direct impact on the ability of a neural network model to learn, but it is not always clear how to pick good settings at the start of training. A solution to this problem may be to have the neural network model 133 adapt an adequate learning rate parameter as the model 133 is being trained. FIG. 5A illustrates and example algorithm 190 that may be used to adapt the learning rate $\mu$. The algorithm 190 provides an aggressive reducing scheme when necessary and increases to the learning rate $\mu$ are made in a more cautious manner if the neural network model 133 is converging properly. Larger learning rates are desirable when convergence is proceeding in a consistent fashion, because this will cause the model 133 to converge more quickly. However, a large learning rate can lead to erratic behavior that can cause the model 133 to either stop learning altogether or else for the error to jump around in an uncontrolled fashion. In this case, it is important to aggressively decrease the learning rate $\mu$ to halt this undesirable behavior. There are many other algorithms that automatically adapt the learning rate parameter. Some argue that it is necessary to have a separate learning rate parameter for every individual weight. Two such methods are the Jacobs' Delta-Bar-Delta method and the Rprop algorithm (which stands for "resilient propagation"). These two algorithms also are less aggressive in adjusting the learning rate parameters.

The algorithm 190 relies on a single learning rate parameter for all weights and utilizes logical rules to determine when to hold steady, increase, or decrease the learning rate μ. As shown in FIG. 5A, this technique uses the current cycle root mean squared (rms) error and the previous cycle rms error, with the current cycle rms error denoted as r and the previous cycle rms error denoted as p. It is also necessary to track how often the cycle rms error is consistently increasing or how often the cycle rms error is consistently decreasing. In neural network models the rms error rarely incurs large jumps, but rather evolves very slowly. The algorithm 190 uses the illustrated adaptive rules to adjust the learning rate μ.

The adaptive learning rate algorithm 190 has the following effect: If the rms error r for the current cycle is at least 1% better than the previous cycle (and the learning rate parameter μ is less than 4), μ can be increased by 3%. If the error is not at least 1% better, but is still better, the algorithm 190 checks to see if μ has been consistently decreasing for 10 cycles. If μ has been consistently decreasing (and μ is not too large), then it is safe to increase μ by 3%. If the error for the current cycle has increased more than 3% from the previous cycle's error, cut μ by 30%. If μ has not increased by more than 3%, but still has increased, the algorithm 190 increments the count for how many cycles μ has been increasing. If μ has increased 5 cycles in a row, then cut μ by 10%. If none of the above conditions are met, it is safe to make no change to the learning rate μ and go on to the next cycle. When the learning rate is cut by 30%, it makes sense to also set the momentum parameter to 0 so that μ can have some cycles to settle, although increasing momentum can help to reduce oscillation. As soon as the error starts to decrease again, as desired, the momentum parameter α can be reset back to its original value.

A model, such as those disclosed herein, produces an output O in response to a vector of input parameters $x_i$ in the $m^{th}$ input data set 25. Thus, all the n inputs to the model 133 may be represented by a collection of input vectors (an input matrix) $I_m = [x_1, x_2, X_3 \ldots x_n]$ where each $x_k$ is the input vector related to the $k^{th}$ entity. Each input parameter $p_j$ is $j^{th}$ parameter of the each of the n input vectors, or equivalently stated $p_j$ can be viewed as the label for the $j^{th}$ row of the input matrix $I_m$. Each of the elements in each row j of the matrix $I_m$ may take on a range of values. Ideally, a human operator or analyst, such as end user 31A (see FIG. 1) or other recipient of the model output O would be able to see and/or understand the effect or contribution of parameter $p_j$ on output O; understanding the effects or contributions of each parameter $p_j$ to a desired output O is important for the end user 31A to develop a fuller appreciation of the underlying correlations and causalities, and hence, the potential importance of a specific parameter $p_j$ from the $m^{th}$ data set 25 to the output O. In less adaptive machine learning techniques like decision trees, linear regression, and logistic regression, if the models are not overfit, the sensitivities may be observed directly. Seeing and understanding such effects or contributions often is possible with linear models for which the effects of each input parameter is separable; for example, for a system employing a linear model the user could analyze the covariance matrix, and compute correlation coefficients to determine such information. However, current systems are not capable of making such attributions for models with the complex topologies that typically exist with non-linear models, such as the herein disclosed neural network model 133 and other non-linear models. That is, while technically a well-designed training process with appropriately selected activation functions can properly weight the connections, because of the way the connections are combined in a neural network, in practice there is no straight-forward way to separate, identify, or display the contributions of individual parameters. Indeed, the more complex the topology of a machine learning process, the more difficult it may be to determine the contributions of individual input parameters to the desired output, or to determine the nature of the relationships between or among the input parameters.

To overcome limitations with current data analysis systems, the network sensitivity analysis (NSA) engine 150 executes one or more procedures, such as the procedures described below, based on data input to and output from a fully trained neural network model 133 (or other non-linear models) in order to determine the relationship between various inputs to and outputs from the fully trained neural network model 133 (or other non-linear models). (In this aspect, the fully trained neural network model 133 should be understood to be a model trained satisfactorily from the input data set 25, which may include data segregated to form the training data 113 and test data 115—see, e.g., FIG. 4A.) In addition, the NSA engine 150 may be employed to provide the same or similar information for linear models. In an aspect, execution of the NSA engine 150 results in one or more NSA curves or graphs that may help the analyst (e.g., end user 31A) understand the nature of the impact of each parameter $p_j$ on the output O of the model 133. In an embodiment, execution of the NSA engine 150 begins with an operation to establish the importance or relative contribution of an individual input parameter $p_j$ which is represented by the $j^{th}$ row in the input matrix $I_m$ for the $m^{th}$ input data set 25 presented to the model 133. In another herein-disclosed embodiment, the NSA engine 150 may execute a similar operation to determine the relative contribution of a collection or collections of data to a broader data set that may include more than one input or output parameter.

The operation for establishing the importance of each of the J parameters, where J is the total number of parameters $p_j$, begins by, for each individual parameter, $p_j$, in the set of vectors $I_m = [x_1, x_2, X_3 \ldots x_n]$ for data input to the model 133, sorting the columns of the matrix $I_m$ from the $m^{th}$ data set 25 in ascending (or descending) order according to the values of the $j^{th}$ parameter of each input data vector $I_m(j,k)$ for k=1 to n. This can be thought of as re-ordering the rows j of the input matrix $I_m$ to create re-ordered matrix $I_{m,j}$ where the values in the $j^{th}$ row are ascending or descending. Next, the NSA engine 150 separates the columns of the re-ordered matrix $I_{m,j}$ from the $m^{th}$ data set 25 into a number of groups, N* based on the values in the $j^{th}$ row of the re-ordered matrix $I_{m,j}$. In an aspect, a human user may specify the hyper-parameter, N*, as an input to the NSA process, or N* may be optimally calculated for the parameters $p_j$ with real values, but the actual number of groups for each parameter $p_j$ might be less than a selected value for N*. For discrete parameters, or even non-numeric parameters, N* can be at most the number of distinct values of the parameter in the $j^{th}$ row of the input matrix $I_m$ for k=1 to n. However, if the selected N* value is too large the NSA engine 150 may not be able to sufficiently sample the input-output relationship for each input value, which could result in a "noisy" NSA curve. If the selected N* is too small, the order of the NSA curve may be too low, and the NSA curve may not embody important structural characteristics of the input-output relationship. For continuous normalized input parameters, a selection of N*=10 may be sufficient to produce NSA curves that balance the sampling structure trade-off. As one skilled in the art will appreciate, the input data 25 may include only numeric data or a combination of numeric data and other data. In an aspect, data other than numeric data may be converted to numeric data. For example, Yes/No and Male/Female data may be represented by a 0 or a 1, respectively. Months of a year may be represented by 1 . . . 12, etc. Other schemes may be used to render non-numeric input data suitable for use in the model 133.

Figure 5B:
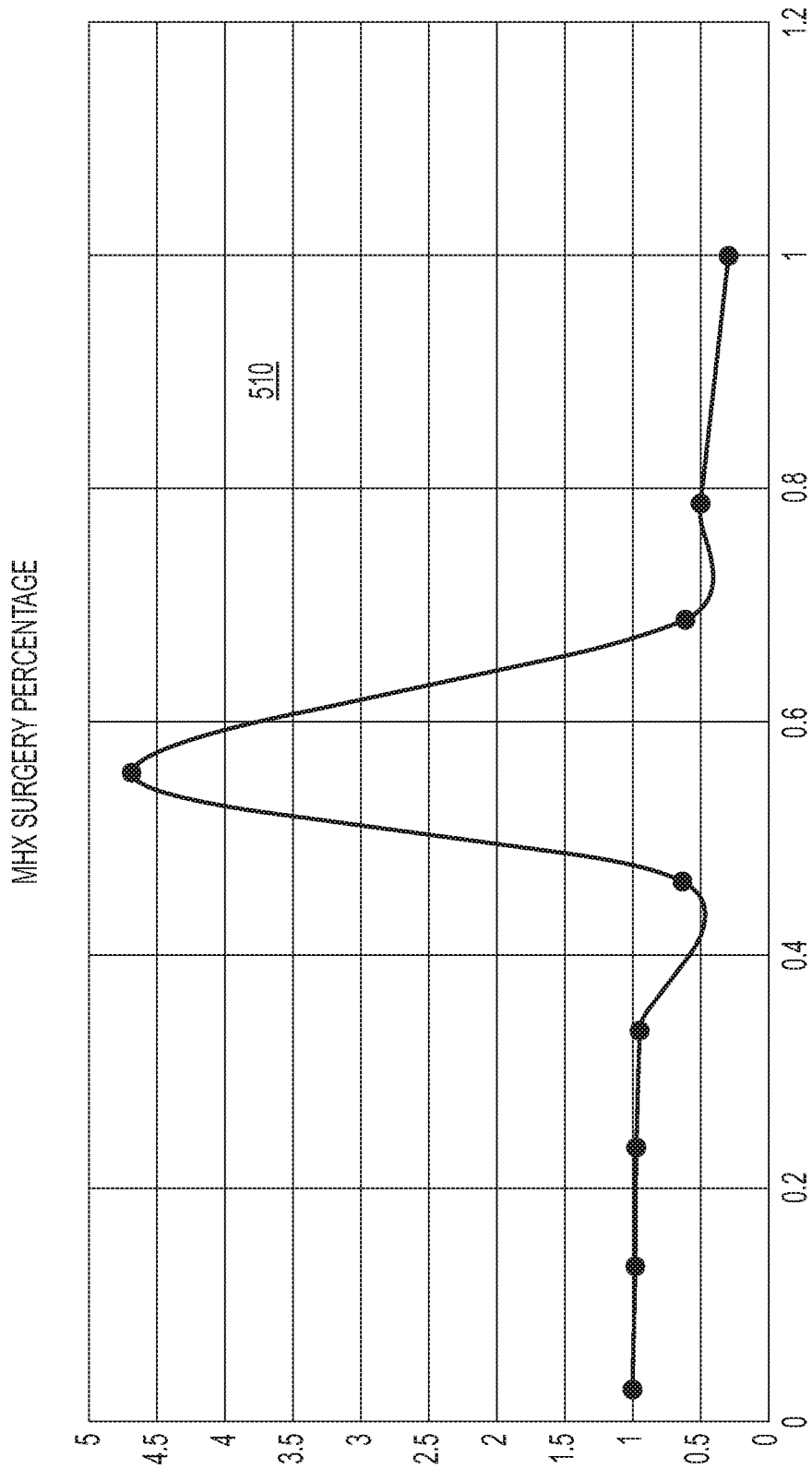
FIGS. 5B and 5C illustrate example network sensitivity analysis (NSA) curves generated by components of the system of FIG. 4A and used to evaluate the contribution of parameters in a data set input to the neural network model of FIG. 4B.

FIG. 5B illustrates an example network sensitivity analysis (NSA) curve 510 generated by components of the system 100 and used to evaluate the contribution of parameters in a data set 25 input to the neural network model 133. FIG. 5B illustrates aspects of the above-noted sampling structure trade-off. As can be seen in FIG. 5B, N* is 9 and the input data are grouped from 0 to 1.0. As one skilled in the art would appreciate, were N* chosen to be much smaller, such as 2 or 3, the NSA curve would be flat or close to flat, and certainly would not exhibit the steep parabola at 0.55 on the x-axis (i.e., the input). However, were N* chosen to be much larger, for example, 1,000, the resulting NSA curve would display numerous spikes, and thus would be difficult to interpret. The NSA curve 510 of FIG. 5B also illustrates the relative frequency of malpractice claims among 90,000 doctors based on the percentage of each physician's procedures that are classified as surgeries. With surgeries being a low percentage of a physician's procedures, the risk of a malpractice claim is low, as might be expected. When a physician's practice is exclusively, or nearly exclusively surgery, the risk of a malpractice claim is even lower (the NSA curve 510 has an overall negative slope). However, for physicians who devote approximately half their time to surgery, the malpractice risk is highest, nearly 12 times the minimum. This NSA curve 510, therefore, points out a potentially important contribution to quantifying malpractice risk among physicians, a contribution that could not be discerned by simply viewing an output of a non-linear machine learning model in a conventional or current data evaluation system. Other aspects of insights and data contributions that may be gleaned from the example NSA curve 510 are discussed in more detail herein.

In an aspect, the data set 25 of input vectors $x_k$ may be separated in to groups $G_i$, where each $G_i$ is a is a collection of columns ($G_i$ is, in fact, a matrix) of the re-ordered matrix $I_{m,j}$, where i varies from 1 to N* by simply taking approximately equal numbers of input vectors $x_k$ to form each group $G_i$. In another aspect, to separate the columns of the re-ordered matrix $I_{m,j}$ ordered by their row j values into input vector groups $G_i$ where i=1 to N*, a tolerance parameter is defined as TOL=[($I_{m,j}$(j,n)−$I_{m,j}$(j, 1)]/N*. Next, starting with the first vector in the N*-sorted $m^{th}$ data set 25, and beginning with $G_1$ for the jth parameter, the NSA engine 150 sets $k_0$=1 and then determines if [$I_{m,j}$(j, $k_0$)−$I_{m,j}$(j, k+1)]<TOL; if so then the $I_{m,j}$(j, k+1) k+1 column is placed in $G_i$; otherwise the $I_{m,j}$(j, k+1) k+1 column is placed in $G_{i+1}$ and $k_0$ is set to be equal to $I_{m,j}$(j, k+1). Then, j is incremented by one and the process is repeated until the input Groups $G_1$, $G_2$, . . . $G_{N*}$ are formed. In yet another aspect, to improve the comparability of NSA curves resulting from neural network models trained using different sets of input vectors, a user may specify that the groups $G_i$ are created to be of approximately equal size, with the requirement that the columns of $I_{m,j}$(j,k) with equal values in the $j^{th}$ position of any input vector $x_k$ are placed in the same group $G_i$. The chosen process is repeated until the set of (sorted) input vectors represented in the re-ordered matrix $I_{m,j}$ is exhausted, resulting in groups {$G_1$, $G_2$, . . . , $G_{N*}$}.

After the data are segregated, each vector in each group $G_i$ is input into the fully trained model 133 and the average of the resulting output for each group $G_i$ is computed. For each group $G_i$, the mean of the values in the $j^{th}$ row of the $G_i^{th}$ group matrix of input vectors is computed, and the mean of the outputs from the model 133 from each input vector (column) in the $i^{th}$ group matrix $G_i$ of input vectors is computed. Finally, the mean value of the $j^{th}$ row of the group matrix $G_i$ is computed. In an embodiment, each of the means of the outputs is normalized by dividing by the mean of the output E[$O_i$] where E is the Expected Value of elements in the $j^{th}$ row of the $i^{th}$ group matrix $G_i$, so that key parameters from different populations may be compared on a similar scale. The resulting plot of normalized mean output versus the mean input is termed an NSA curve for the parameter in the $j^{th}$ position. Examples of NSA curves generated by execution of the system 100 are shown in FIGS. 5B, 5C and 6B-6G.

The preceding discussion of NSA engine 150 operations referred to matrices of parameters p ordered in rows and entities k ordered in columns. One skilled in the art will appreciate that other matrix arrangements are possible and contemplated by the above disclosure.

Armed now with the neural network model 133 and the NSA of individual input parameters, the NSA of entire data sets is described in detail. There are three major factors that are considered for entire swath of data contributed to the input training and test data:

Quality of data contributed
Quantity of data contributed
Insights generated based on the data contributed.

While ascertaining the quantity of data contributed may seem straightforward, there are some additional aspects of data that may need to be considered. Real-world situations may have one or more of the following characteristics:

Periodicity
Cycles
Secular trends
Oscillating curves about the secular trend
Outliers
Accuracy of the model
Confidence Intervals of the results
NSA curves of individual parameters in the input data
White Noise A serious study of each of these aspects may be considered, and therefore, each of the three major factors are intertwined in determining the usefulness or strength of a contributed set of data. For example, data might be contributed that might or might not give insight into cycles of the data, but the contributed data might additionally increase accuracy of the model. Such a model may be easily separated into yearly cycles.

If a new contributed data set does not span outside of the existing data, then no new information can be gleaned from the new data regarding yearly cycles, but there may be a contribution to increased accuracy of the model.

Each contributed data set N (i.e., the data 25 of FIG. 1) may include one or more parameters (i.e., input parameters), and two different contributed data sets may include one or more different parameters (i.e., the parameters in a first data set may not coincide with the parameters in a second data set). The totality of data sets, therefore, may include k distinct input parameters but one or more data sets may contribute less than k input parameters. To determine the relative contribution of each of N data sets of k distinct input parameters in generating observation O, the system 100, and corresponding methods, may begin with a model (e.g., model 133) that is trained using all N data sets ($NN_N$). The system 100 generates individual NSA curves for each of the $i^{th}$ input parameters to the model 133 using all N data sets (NSA$_{i,N}$). Next, the system 100 cycles through each of the N data sets, training the model 133 with the $j^{th}$ data set removed. For the $j^{th}$ data set, the system 100 trains the model and generates NSA curves NSA$_{i,-j}$ for the $i^{th}$ parameter and the $j^{th}$ data set removed. For the $j^{th}$ data set, in an aspect, the system 100 computes an absolute value of an area between the NSA curves NSA$_{i,N}$ and NSA$_{N-j}$ as a measure M$_j$ of the relative contribution of the $j^{th}$ data set to the output from the $i^{th}$ parameter in the model 133. Then the system 100 sums the areas across the k parameters to determine a measure M$_j$ for each data set. The relative strength S$_j$ for the $j^{th}$ data set may be expressed as $$S_j = \frac{M_j}{\sum_{i=1}^{N} M_i}$$

The measure M$_i$ for each data set contribution also may be computed using the root mean squared difference between the samples that make up the NSA curves multiplied by the range of the $i^{th}$ input parameter as a substitute for the absolute area between the NSA curves. Other techniques such as Absolute Percentage Error (APE) also may be used. The rest of the procedure is the same as described above.

Thus, a method for evaluating the relative contribution of an individual data set N$_j$ in a plurality of data sets N$_{(i \ldots j \ldots n)}$ to a problem solution O, the data sets N$_{(i \ldots j \ldots n)}$ processed and applied to a machine learning model begins with a processor executing a network sensitivity analysis (NSA). Executing the NSA includes generating a N NSA curve for each of a plurality distinct input parameters in the data sets N$_{(i \ldots j \ldots n)}$ by computing a solution O$_N$ with all of the data sets N$_{(i \ldots j \ldots n)}$; generating a N−j NSA curve (i.e., a NSA curve with the $j^{th}$ data set removed from the N data sets) for each of the plurality of distinct input parameters by removing the $j^{th}$ data set from the data sets N$_{(i \ldots j \ldots n)}$, and computing a solution O$_{N-j}$ with the $j^{th}$ data set removed. Finally, executing the NSA involves determining a measure M$_j$ of a contribution of a $j^{th}$ data set based on a difference between the N NSA curves and the N−j NSA curves, and computing a relative strength S$_j$ of each of the N$_{(i \ldots n)}$ data sets as a function of the measure M$_i$:

$$S_j = \frac{M_j}{\sum_{i=1}^{N} M_i}.$$

The importance of each of the aspects listed above is problem specific. For example, in a case where the same data set 25 are contributed by two different sources, theoretically there should be no enhancement of the model from the second contribution. The system 100 can either not recognize and credit the second contributor at all, because new information is presented to the model, or else the system 100 can recognize and credit each contributor equally. It may be that in some problem cases the periodicity or cycles is of supreme importance, and in other problem instances the accuracy of the model is of supreme importance.

Accuracy of the neural network model 133 may be characterized by how the model 133 performs on the test data 115 as opposed to the training data 113. As noted herein, a model may be over-fit to the training data, and the resulting model may not generalize very well to the test data. The accuracy of a neural network model against a data set can be measured by either the root mean-squared (rms) error or the Absolute Percentage Error (ape) of the prediction model against the known answers. Either technique is well known by practitioners of neural network models. The rms error is computed by the square root of the average of the squares of the errors, and the ape is computed by the average of the absolute value of the errors.

Experiment 1: This experiment applies the inventive features disclosed herein to Medicare provider utilization data, to predict the risk of malpractice for Florida doctors. Annual medical liability costs are in the tens of billions, 7.4% of physicians have a malpractice claim per year, and 1.6% have a claim that leads to payment. The ability to predict which physicians have elevated risk for a malpractice claim may therefore be of interest. The herein disclosed system 100 predicts the risk of physicians being sued for malpractice and generates physician risk and work profiles. The system 100 uses provider utilization data and medical malpractice history for training and testing. The utilization data can be all claims processed by the provider or a subset of their claims, such as Medicare data. The medical malpractice data are needed for the years upon which the model will be trained and tested. The Medicare data are used to create yearly profiles for each physician, and these profiles are inputted into the neural network model 133 to predict malpractice risk for each physician. The physicians were sorted into deciles based on their predicted risk. The model 133 demonstrates the ability to discriminate between high and low risk physicians, with the physicians in the top 20% of estimated risk being 20.5 times more likely to be sued than the physicians in the bottom 20% of estimated risk.

Figure 6A:
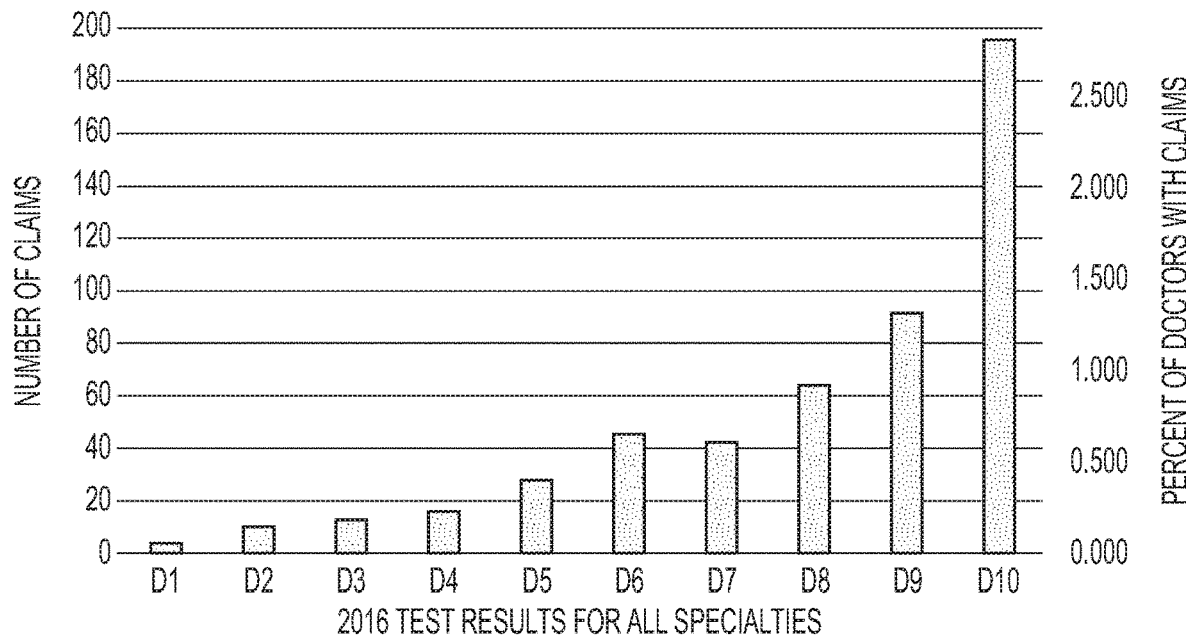
FIGS. 6A-6G illustrate aspects of an experimental operation executed by the example system of FIG. 3.
Figure 6B:
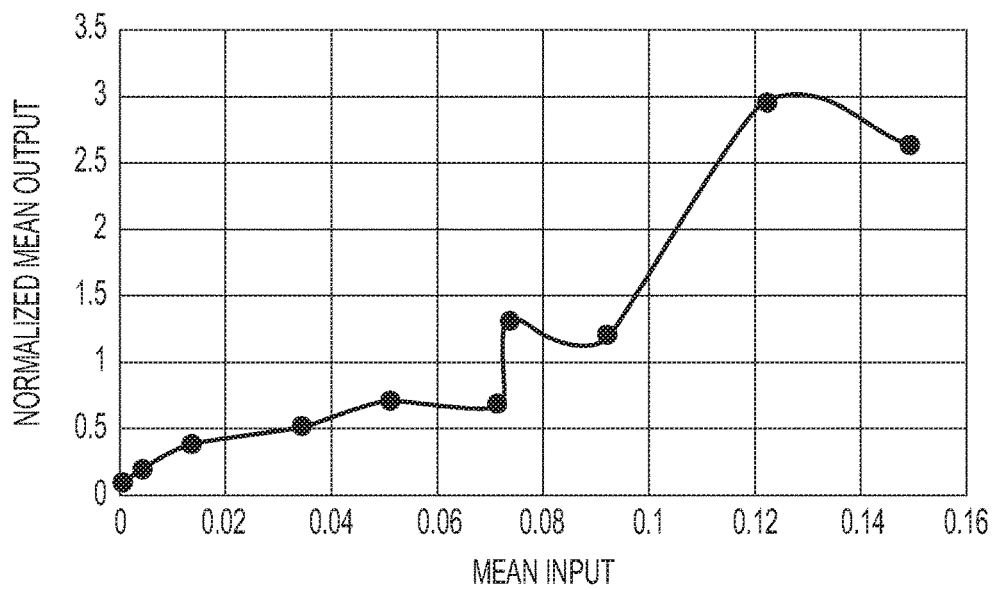
Figure 6C:
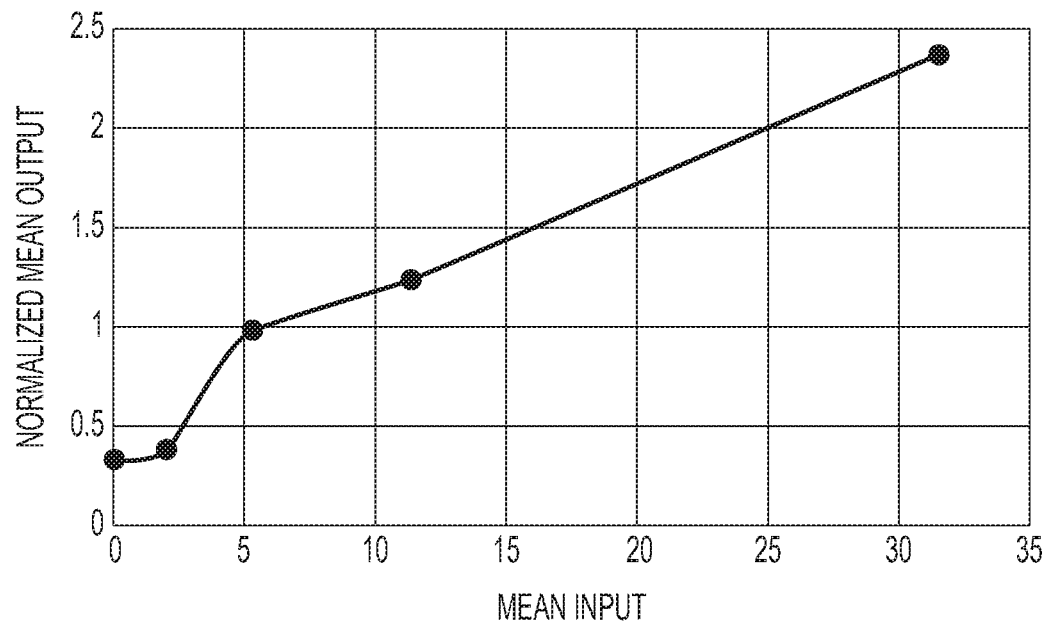
Figure 6D:
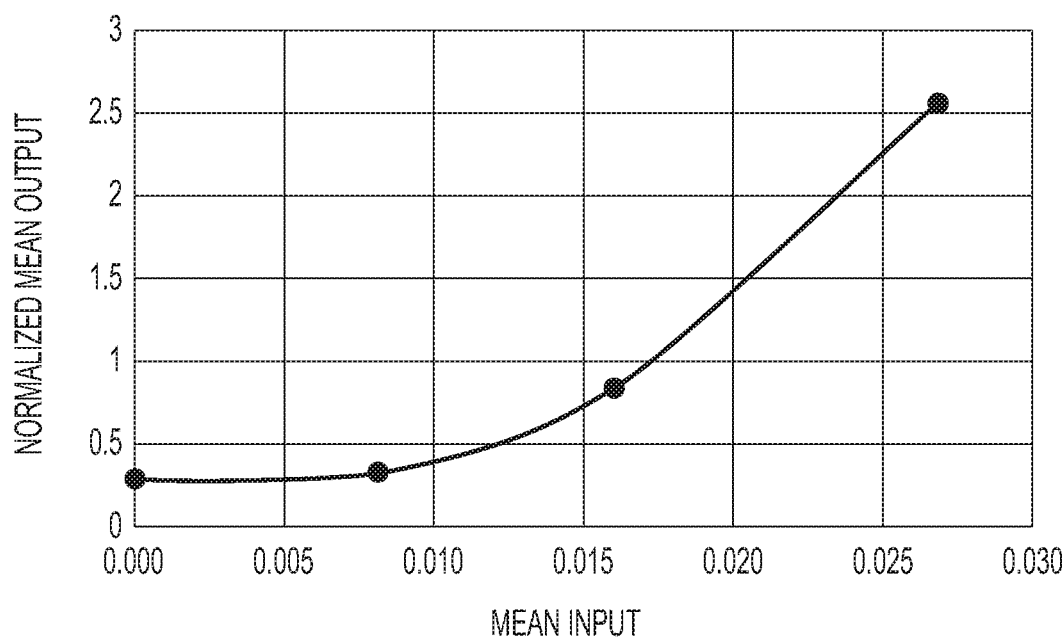
Figure 6E:
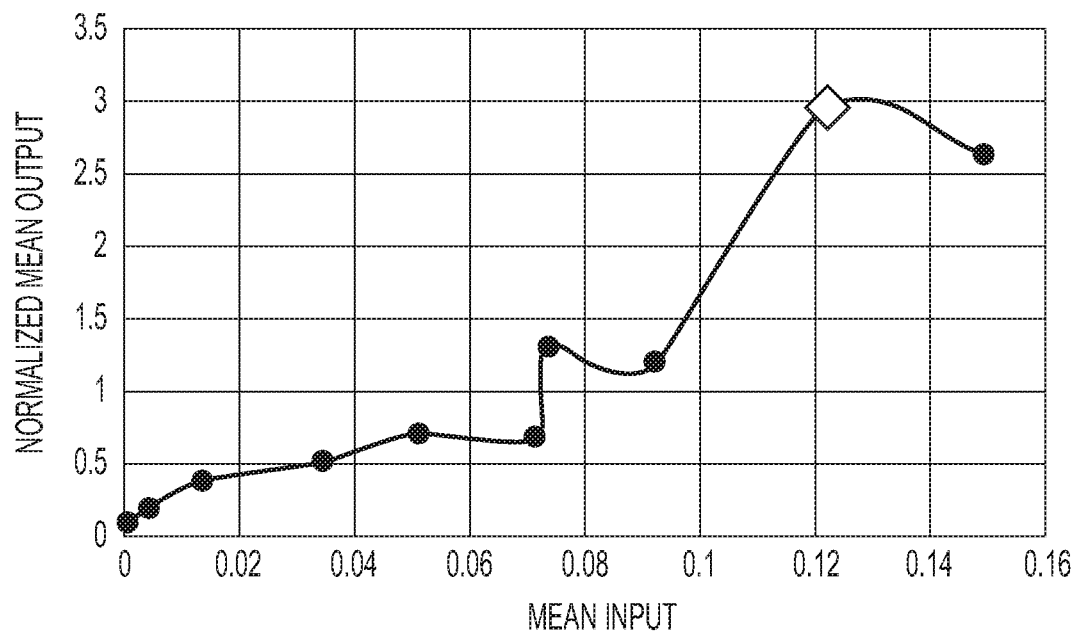
Figure 6F:
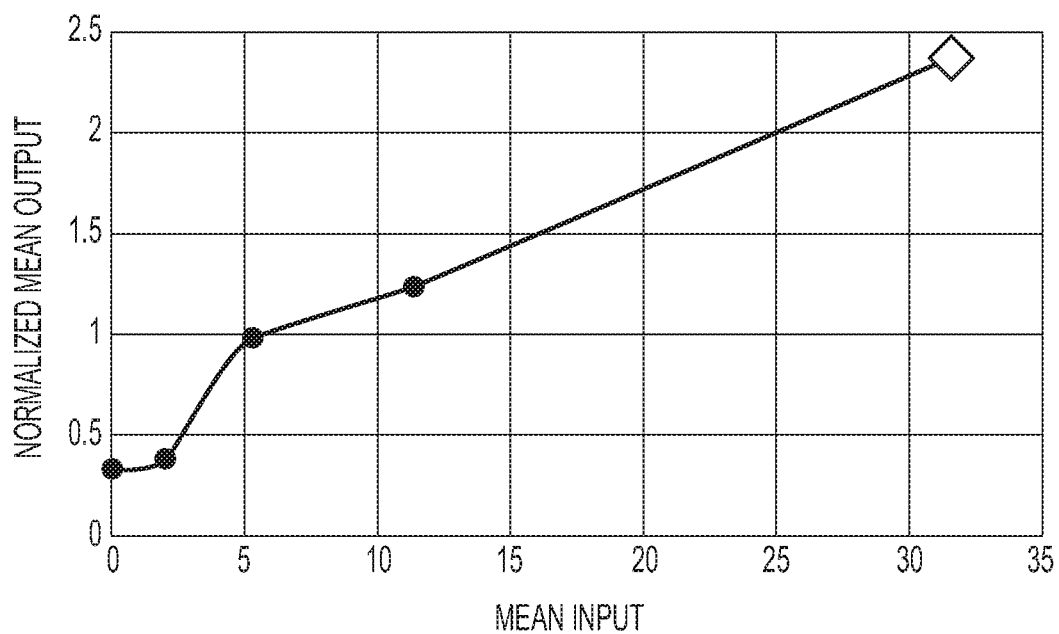
Figure 6G:
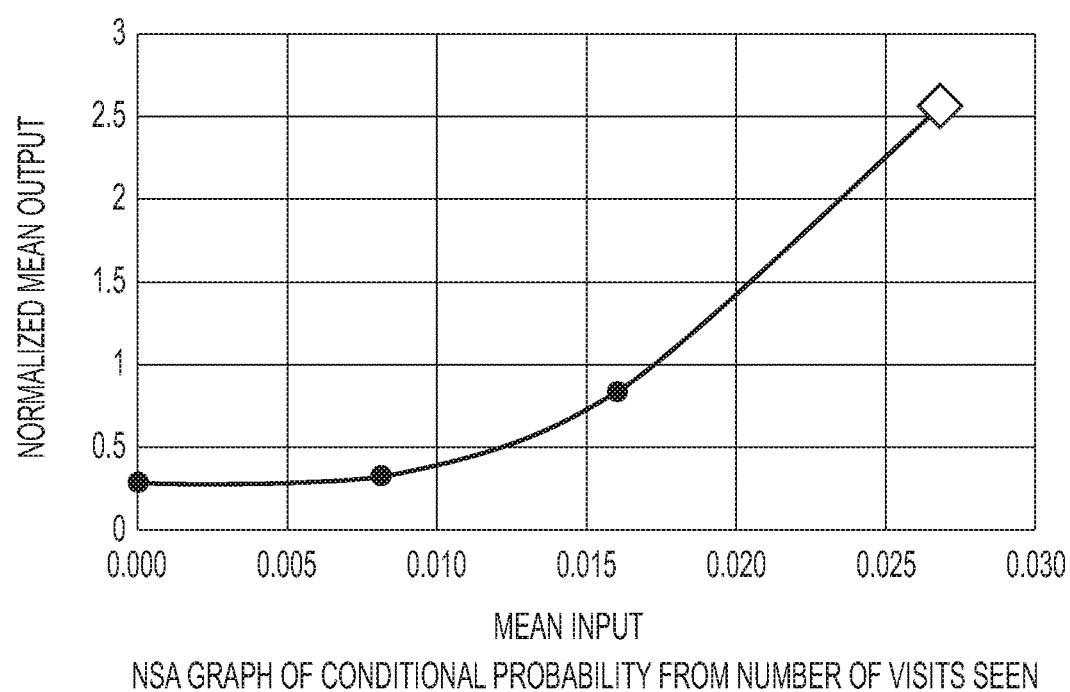

There were three main sources of data for this experiment: Medicare provider utilization and payment data, the NPPES NPI registry, and Florida malpractice claims. Medicare provider utilization and payment data contains over 150 million Medicare line items across five years. These data cover procedures and prescribed drugs that were charged to Medicare by all physicians in the United States. The NPPES NPI registry contains physician information for every registered physician in the United States. These data include physician specialty and practice information. Florida publishes all malpractice claims that resulted in a payout, either a successful court case or an out of court settlement. These data contain over 55,000 claims from 1985-2018, including nearly 10,000 in the model period of 2013-2016. Returning to FIG. 3, the system 100 employs a pre-processor 111 that takes in the input data and creates yearly physician profiles, the neural network model 133, that takes the yearly physician profiles and calculates predicted yearly risk and compares the prediction to the actual malpractice claims, and a postprocessor 170 that analyzes which variables contributed the most to physicians' risk. The pre-processor 111 takes in the input data et 25 and creates yearly profiles for each provider 20. The pre-processor 111 can be used within a database structure or as a data ingestion process. In this experiment, the pre-processor 111 reads in Medicare provider utilization and payment data, the NPPES NPI registry, and Florida malpractice claims. The pre-processor 111 aggregates the Medicare data for a given physician and creates a physician-year profile. This physician-year profile is a vector of parameters, e.g. Total Procedures or Total Drug Cost prescribed, and whether the physician had a malpractice claim in that year. Some parameters are simple aggregations of the procedures performed or drugs prescribed by a physician. Other parameters are computed in a two-step process. The first step is computing the risk of one procedure or drug, which is executed by dividing the amount of procedures done or drugs prescribed by physicians who received malpractice claims by the amount of procedures done or drugs prescribed by all physicians. The second step in the process is applying a weighted average of all procedures done by a single provider multiplied by risk. The neural network optimizes prediction accuracy by finding complex relationships between the input and output data. The input data consist of variables describing the work done by the physician during the profile year, and the output is a binary variable stating whether the physician was sued in the profile year. While training, the neural network model 133 adjusts the weights for each input to minimize the model's root mean squared error. The weights created by this training period then are used with the physician inputs to predict the physician risk for the test year. This predicted risk then is compared to the actual risk of malpractice in the test year to ensure the model generalizes to the test year. For this test case, the neural network took in the physician year profiles created by the pre-processor and trained on the physician profiles given in the three training years, 2013-2015, and then tested on 2016. The post-processing operation includes three parts: grouping the physicians, computing the Network Sensitivity Analysis, and computing individual physician profiles. The grouping operation includes rank-ordering physicians based on their predicted risk for the test year and then aggregated into groups. In this experiment, the physicians were aggregated into evenly sized deciles. This aggregation may be helpful because the probability of being sued in a year is low, so the physicians are compared in large groups to determine if their predicted risk is accurate. Network Sensitivity Analysis (NSA) is used to determine which variables had the largest effect on physician risk. The NSA takes one input parameter and sorts all vectors of variables in the training set according to that parameter. The population of training vectors is then sorted into groups of approximately equal size. The maximum number of groups used was 10, but there could be fewer groups if necessary to keep the groups equal size. Input parameters of equal value will always be in the same group. Once the groups are created, the average of the input parameter and the normalized mean output (physician risk normalized to 1 across all groups) are computed for each group. This process is repeated for every input parameter, and then the parameters are ranked by their impact on the physician risk. Finally, individual physician profiles may be computed. These profiles show the physician's specialty, their percentile ranking of their yearly risk, the physician's grouping in the highest impact parameters, and the relative risk and relative amount of their procedures performed, and drugs prescribed. The physicians are sorted into deciles based on predicted risk and then the number of physicians with malpractice claims in the test year of 2016 are tallied for each decile. The results are shown in FIG. 6A. The model 133 ranked the physician's risks accurately, with the physicians in the top 20% of estimated risk being 20.5 times more likely to be sued than the physicians in the lower 20% of risk, and the physicians in the top half 6.2 times more likely to be sued than the physicians in the bottom half of risk. Three of the parameters that effect physician malpractice risk the most as calculated by the Network Sensitivity Analysis are the conditional probability from the provider specialty (base rate for claims for a given specialty), the total number of procedures performed, and the conditional probability from the number of visits seen (likelihood that one receives a claim based on the type and number of visits). The conditional probability from provider specialty, shown in FIG. 6B, is the probability that a physician will receive a malpractice claim based on the percentage of claims per physician year in his or her specialty. Total number of procedures performed, shown in FIG. 6C, is the total number of procedures performed by a physician and covered by Medicare over the test year. Finally, the conditional probability from the number of visits seen, shown in FIG. 6D, is the probability that a provider will receive a malpractice claim based on the weighted average of the expected risk of the procedures he did over the test year. A physician selected for extra analysis is NPI 1912028853. This physician practices general surgery. The physician is in the 99th percentile of risk, with a physician risk ranking of 69436 out of 69438 physicians studied, where a higher ranking indicates higher risk. Which group the physician lands in the top parameters given by the NSA analysis is indicated by a square or diamond. This is shown in FIGS. 6E-6G for the conditional probability from the provider specialty, the total number of procedures performed, and the conditional probability from the number of visits seen, respectively. This physician is near the peak of each NSA curve, which is expected from his high probability risk. As disclosed herein the system 100 effectively predicts the risk of malpractice for Florida physicians. The system 100 gives additional data for each physician that shows how the physician's risk profile compares to other physicians as well as the sources of risk. The system 100 produces data on the relative risks of every procedure performed and drug prescribed.

Figure 7:
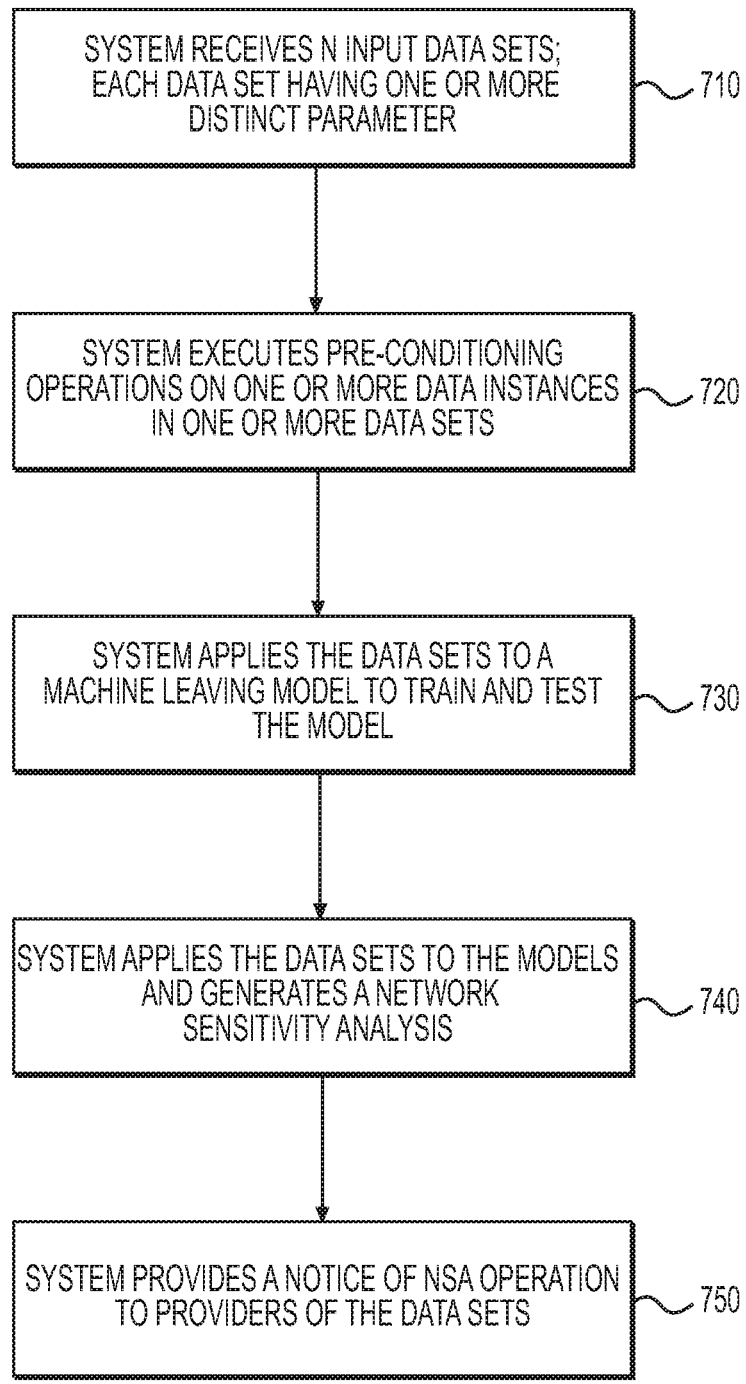
FIGS. 7-10 are flowcharts illustrating example methods executed by the example system of FIG. 3.

FIG. 7 is a flowchart illustrating example operations of the system 100 of FIGS. 3-4B. In FIG. 7, operation 700 begins in block 710 when the system 100 receives one or more data sets (e.g., N data sets 25) from data providers 20. In block 720, the system 100 may execute one or more data pre-processing routines on one or more of the input data sets 25. In block 730, the system 100, either automatically and autonomously, or under direction of a user, selects a subset of the input data sets 25 to serve as a training data set 113 and another subset of the input data sets to serve as a test data set 115. The system 100 then executes to train a machine learning model, such as the neural network model 133, and subsequently to test the machine learning model 133 using the training data set(s) and the test data set, respectively. In block 740, with the model trained and verified, the system 100 may apply the model to existing and/or new data sets (e.g., to existing data sets N and/or new data sets P) to make predictions and/or to classify data. Application of the model to the data sets N may result in one or more observations O based on the input data. The system 100 also determines a relative strength S of each of the data sets N. In block 750, the system 100 may support notification of specific providers $21_i$ relative to the strength $S_i$ of their supplied data sets.

Figure 8:
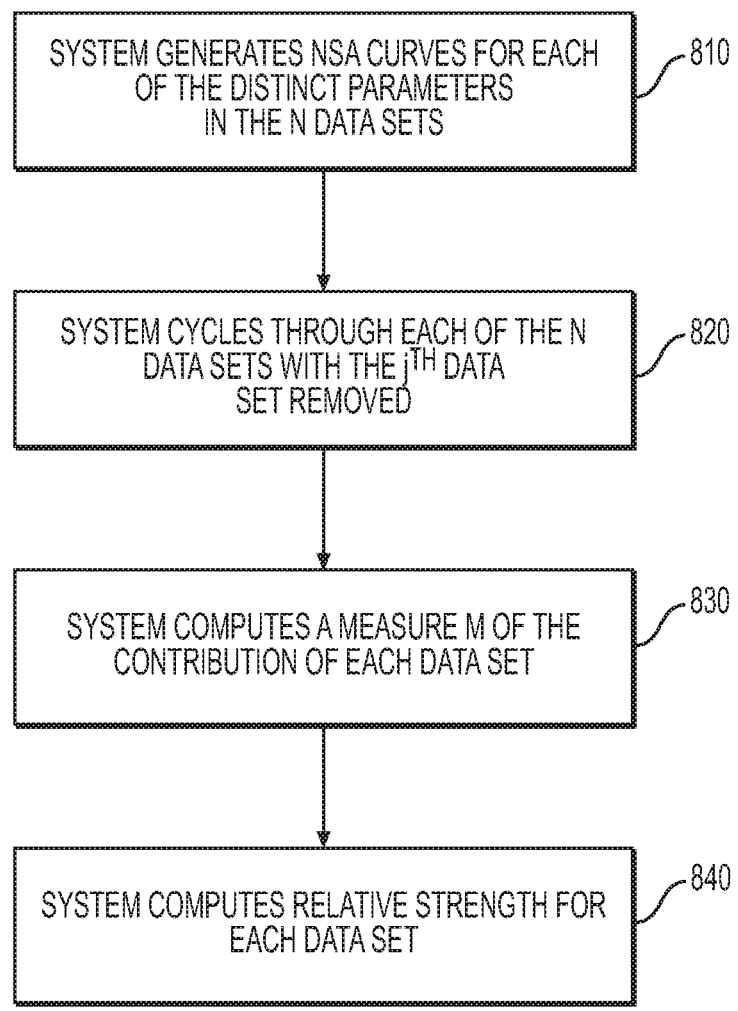

FIG. 8 is a flowchart illustrating a network sensitivity analysis (NSA) executed by the system 100 to determine the relative strength $S_i$ of each of the N (or N+P) data sets. In determining the relative strength $S_i$, the operation does not depend on each data set $N_i$ having the same parameters, or the same or a similar quantity of data. Rather, the strength $S_i$ is determined by a Measure $M_i$ computed as an aspect of the network sensitivity analysis (NSA). In FIG. 8, operation 840a begins in block 810 when the system 100 generates NSA curves for each of the $i^{th}$ input parameters to the model 133 using all N data sets ($NSA_{i,N}$). Next, in block 820, the system 100 cycles through each of the N data sets training the model 133 with the $j^{th}$ data set removed. For the $j^{th}$ data set, the system 100 trains the model 133 and generates NSA curves $NSA_{i,-j}$ for the $j^{th}$ parameter and the $j^{th}$ data set removed. In block 830, for the $j^{th}$ data set, the system 100 computes a measure $M_j$ of the absolute value of an area between the NSA curves as a indication of the relative contribution of the $j^{th}$ data set to the output from the $i^{th}$ parameter in the model 133. In an aspect, the system 100 sums the areas across the k parameters to determine the measure $M_j$ for each data set. In block 840, the system 100 computes the relative strength $S_j$ for the $j^{th}$ data set as $$S_j = \frac{Mj}{\sum_{i=1}^{N} M_i}.$$

The relative strength $S_j$ of a data set indicates how significant its contribution was to the observation O. In completing the operation of block 840, the system 100 may simply integrate under the NSA curves to produce an absolute value of the differential areas. Alternately, the Measure $M_j$ for each data set contribution can be computed using the root mean squared difference between the samples that make up the NSA curves multiplied by the range of the $i^{th}$ input parameter as a substitute for the absolute area between the NSA curves.

Figure 9:
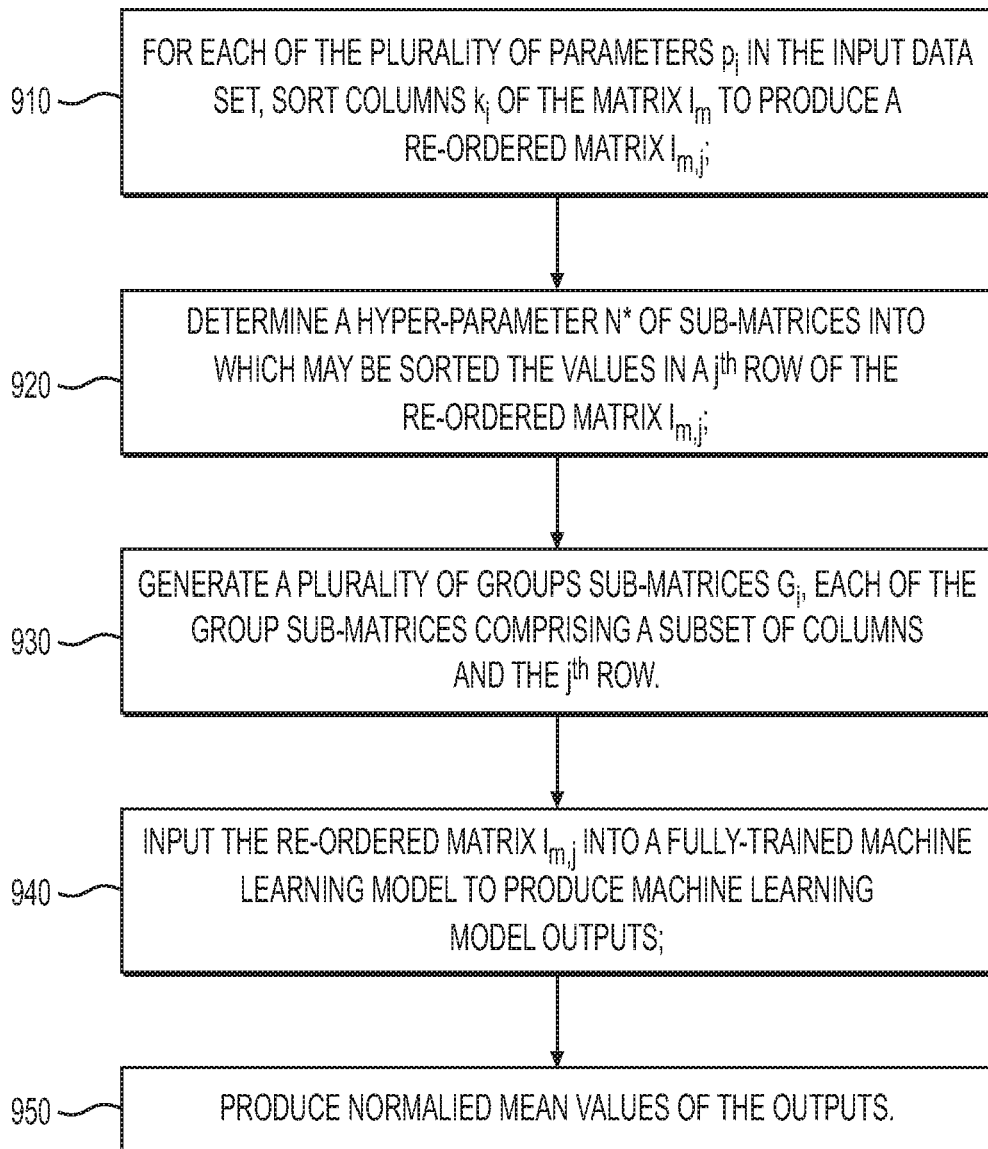

FIG. 9 is a flowchart illustrating an example operations for generating an NSA curve. In FIG. 9, operation 900 begins in block 910 with an operation to establish the importance or relative contribution of an individual input parameter $p_j$ which is represented by the $j^{th}$ row in the input matrix $I_m$ for the $m^{th}$ input data set 25 presented to the model 133 when the NSA engine 150 generates NSA curves for each of the $i^{th}$ input parameters to the model 133 using all N data sets ($NSA_{i,N}$). Alternately, the NSA engine 150 may use less than all N data sets 25. Next, for each of the parameters $p_j$, the NSA engine 150 begins by sorting the columns $k_i$ of the matrix $I_m$. The parameters $p_i$ may be sorted in order. The order may be a numerical order based on a value of an element, defined as an intersection of a row and a column in the matrix $I_m$. The order may be an ascending order or a descending order. The result is a re-ordered matrix $I_{m,j}$.

In block 920, the NSA engine 150 determines a number N* (i.e., a hyper-parameter) of columns k into which may be sorted the values in the $j^{th}$ row of the re-ordered matrix $I_{m,j}$. As an aspect of block 920, the NSA engine 150 may determine hyper-parameter N* as a default number of columns $k_i$ or the NSA engine 150 may compute N* as a function of the number of discrete elements present in the input data set 25. Thus, elements that have a same value as other elements may be represented in a single column of the re-ordered matrix $I_{m,j}$. The result is a matrix $G_{j,k}$ represented as a single row j and multiple columns k. In block 930, the NSA engine 150 generates a plurality of group sub-matrices $G_i$, with each $G_i$ including a subset of columns k for the jth row. The result is a matrix $G_{j,k}$ represented as a single row j and multiple columns k.

In block 940, the NSA engine 150 inputs into the fully-trained model 133, and computes an average of the resulting output for each group matrix $G_i$. In block 950, the NSA engine 150 computes a mean of the parameter values in the $j^{th}$ row of the group matrix $G_i^{th}$.

FIG. 10 illustrates the operations of block 950 in more detail. In FIG. 10, operation 950a begins in block 960 with the NSA engine 150 computing an average of the resulting machine learning model output for each group matrix $G_i$. In block 965, the NSA engine 150 computes a mean of the parameter values in the $j^{th}$ row of the group matrix $G_i^{th}$. In block 970, the NSA engine 150 computes the mean of the outputs from the model 133 from each input vector (column) in the $i^{th}$ group matrix $G_i$ of input vectors. In block 975, the NSA engine 150 computes the mean value of the $j^{th}$ row of the group matrix $G_i$. In an embodiment, in block 980, each of the means of the outputs is normalized by dividing by the mean of the output $\stackrel{\scriptscriptstyle\smile}{E}[O_i]$ where $\stackrel{\scriptscriptstyle\smile}{E}$ is the Expected Value of elements in the $j^{th}$ row of the $i^{th}$ group matrix $G_i$, so that key parameters from different populations may be compared on a similar scale. The NSA engine 150 then may store the computed values and may generate a NSA curve such as the NSA curve 510 shown in FIG. 5B.

Figure 11A:
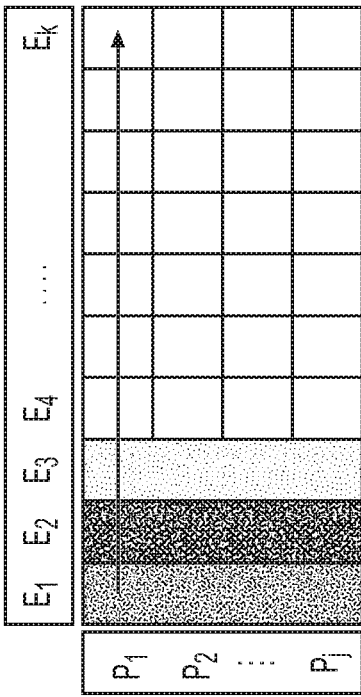
Figure 11B:
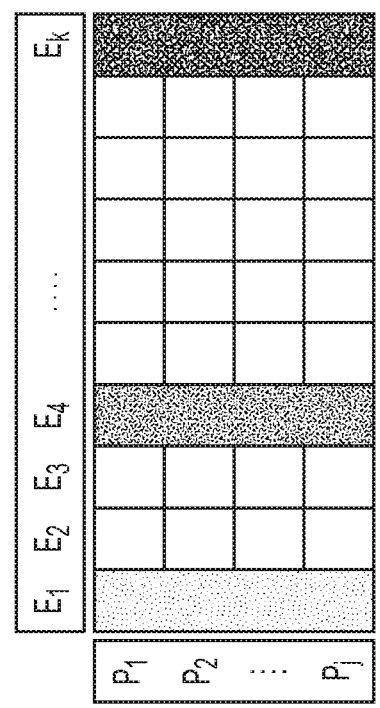
Figure 11D:
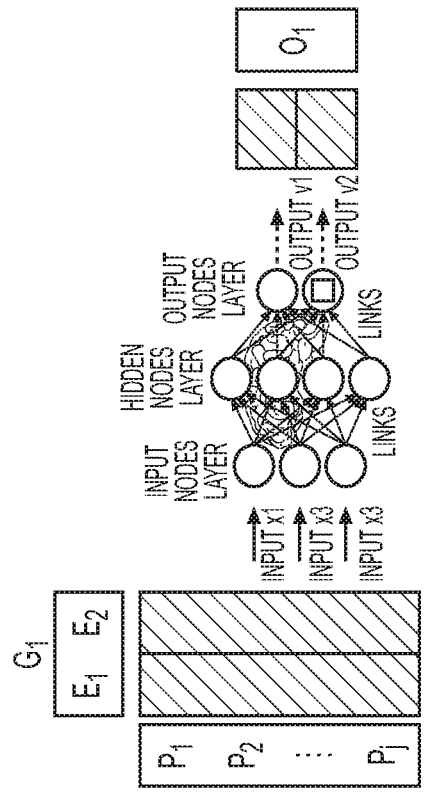
Figure 11C:
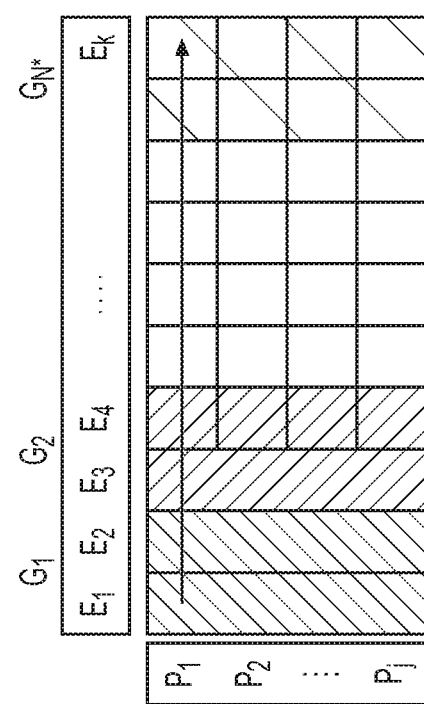

FIGS. 11A-11G provide a pictorial description of the example operations of FIG. 10 that generate NSA curves. Referring to FIG. 11A, the operations begin by generating or accessing an input matrix $I_m$ of k columns and j rows, where each column k is a (j×1) input vector x related to an entity E. Referring to FIG. 11B, and considering the first parameter $P_1$, the input vectors x (columns) associated with each entity E are reordered so that the first row is in ascending order $I_{m,1}$. Referring to FIG. 11C, the $I_{m,1}$ matrix is separated into groups $G_1 \ldots G_{N*}$. Referring to FIG. 11D, the input vectors in group $G_1$ are input into the neural network model 133 and for each input vector x (column of $I_{m,1}$) a corresponding set of outputs $O_1$ is produced. Referring to FIG. 11E, the vectors x in group $G_2$ are input into the neural network model 133 and for each input vector x (column of $I_{m,1}$), a corresponding set of outputs $O_2$ is generated. The process of FIG. 11E is repeated through $G_{N*}$. Referring to FIG. 11F, the NSA engine 150 computes an average of the values in the $1^{st}$ row $x_i$ for each of the $G_i$ matrices and the average of the output $O_i$ from the corresponding inputs. The process of FIG. 11F is repeated for i=1 to N*. Referring to FIG. 11G, the process is completed across all N* groups $G_i$, and each of $y_i$ values is normalized by the average of the $y_i$ values. Therefore $$\langle y_i \rangle = \frac{N * y_i}{\sum_{i=1}^{n*} y_i}.$$

Then a plot the ($x_i$, $\langle y_i \rangle$) for the first parameter is generated as shown in FIG. 11G. The processes of FIGS. 11B to 11G are repeated for each of the j parameters.

Figure 5C:
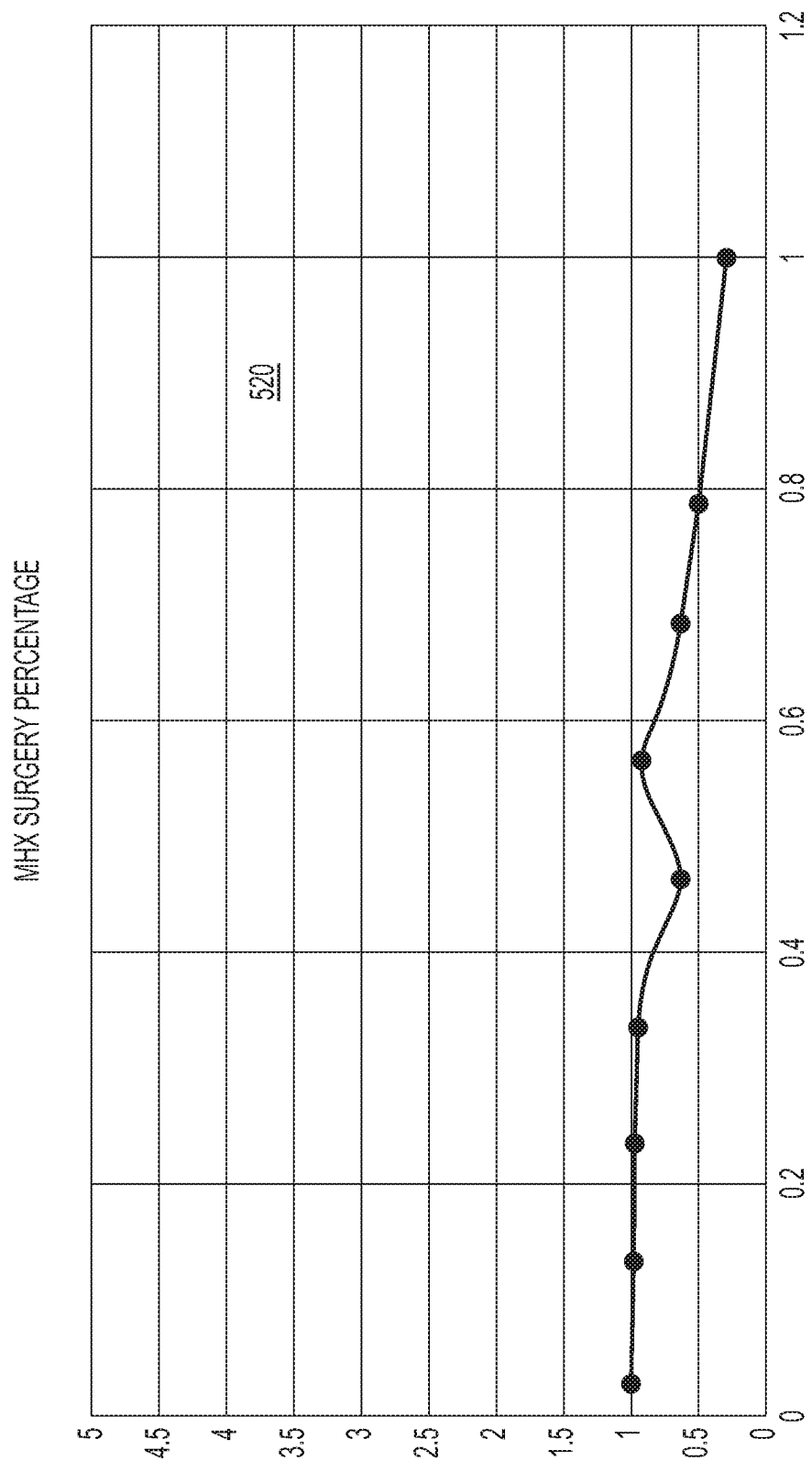

Subsequent to the operations illustrated in FIGS. 9-11G, the NSA engine 150 may execute a parameter evaluation process to determine the relative contribution of individual parameters in multiple data sets $25_i$-$25_m$ to the desired output $O_i$ or to gain other insights as to how a particular parameter effects the output $O_i$. For example, and considering the example NSA curve 510 of FIG. 5B, were multiple data sets 25 used to generate the NSA curve 510, data set 25i would be removed and a new NSA curve 520 (FIG. 5C) would be generated. Thus, FIG. 5C shows the same risk output $O_i$, but with data set $25_i$ removed, the NSA curve 520 essentially is flat (no large parabola at 0.55 as shown in FIG. 5B). The NSA engine 150, or other component of the system 100, may compute a relative importance value based on a difference in the area below NSA curve 520 of FIG. 5C and the NSA curve 510 of FIG. 5B. These data may be stored and may be used by the NSA engine 150 to provide an importance or strength measure to a human user.

The preceding disclosure refers to flowcharts and accompanying descriptions to illustrate the embodiments represented in FIGS. 1-5C. The disclosed devices, components, and systems contemplate using or implementing any suitable technique for performing the steps illustrated. Thus, FIGS. 7-9 are for illustration purposes only and the described or similar steps may be performed at any appropriate time, including concurrently, individually, or in combination. In addition, many of the steps in the flowcharts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs; i.e., one or more modules of computer program instructions, encoded on computer storage medium for execution by one or more processors. A computer storage medium can be, or can be included in, a computer-readable storage device, a computer-readable readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A computer-implemented data evaluation method, comprising:
    a processor receiving a plurality of N data sets, each of the N data sets comprising one or more parameters;
    the processor identifying a relative contribution of one or more of the plurality of N data sets, comprising:
        executing a Network Sensitivity Analysis (NSA) by applying $N_i$ data sets, where i=2 . . . j . . . n, to a trained neural network and generating one or more observations O on the $N_j$ data sets, comprising:
            generating a Ni NSA curve comprising computing an observation $O_{Ni}$ with all the $N_j$ data sets; and
            generating a Ni-j+ NSA curve for each of a plurality of groups of multiple data sets j+, wherein j+ comprises more than one data set but less than n-1 data sets, the generating, comprising:
                iteratively removing each of the groups of the multiple data sets j+ from the $N_j$ data sets, and
                generating, using the neural network, an observation $O_{Ni-j+}$ with each of the groups of the multiple data sets j+ removed; and
            generating a measure $M_{j+}$ of a contribution of each of the groups of the multiple data sets j+ based on the Ni NSA curve and each Ni-j+ NSA curve:
        the processor generating a relative strength $S_{j+}$ of each of the groups of the multiple data sets j+ as a function of the measure $M_{j+}$; and
        the processor providing the relative strength $S_{j+}$ of each of the groups of the multiple data sets j+.

2. The data evaluation method of claim 1, wherein the measure $M_{j+}$ comprises an absolute value of a difference between the Ni NSA curve and the Ni-j+ NSA curve as an indication of the contribution of a removed group of multiple data sets j+.

3. The data evaluation method of claim 2, wherein the difference is a difference in areas under the Ni NSA curve and the Ni-j+ NSA curve.

4. The data evaluation method of claim 1, wherein a group of multiple data sets j+ comprises g unique data sets, the method further comprising determining a relative contribution $M_g$ of each of the q unique data sets relative to the contribution $M_{j+}$ the group of multiple data sets j+.

5. The data evaluation method of claim 1, wherein the relative strength $S_{j+}$ of a group of the multiple data sets j+ is the measure $M_{j+}$ relative to a sum of measures $\Sigma M$ $M_{s+}$ of all non-removed multiple data sets s+, wherein s+ is one or more data sets.

6. The data evaluation method of claim 1, wherein generating the N NSA curve and the Ni-j+ NSA curve, comprises:
    establishing a relative importance of an input parameter $p_x$ in a plurality of input parameters $P_k$ in each data set $N_i$ input to the neural network, the data set $N_i$ represented by a x row by y column matrix $I_i$, an intersection of each row x with each column y defining an element x,y, the method, comprising:
        for parameter $p_i$ in the plurality of parameters $P_k$ in the input data set $N_i$, the processor sorts columns $k_y$ of the matrix $I_i$, to produce a re-ordered matrix $I_{i,x}$ by reordering the columns $k_y$ such that the elements x,y in an $x^{th}$ row are arranged in order of parameter values of the parameter $p_x$,
        the processor determines a hyper-parameter $N^+$ of sub-matrices $G_i$ into which may be sorted the re-ordered columns $k_y$ according to the elements x,y in the $x^{th}$ row of the re-ordered matrix $I_{i,x}$,
        the processor generates a plurality of group sub-matrices $G_i$, each of the group sub-matrices $G_i$ comprising a subset of the re-ordered columns $k_y$ and the $x^{th}$ row of the group sub-matrices $G_i$, and
        the processor inputs the re-ordered matrix $I_{i,x}$ into the trained neural network to produce outputs $O_i$, comprising sequentially imputing data input vectors, defined as the re-ordered columns $k_y$, according to positions of the re-ordered columns $k_y$ in the group sub-matrices $G_i$; and
    the processor produces normalized mean values of the outputs $O_i$.

7. The data evaluation method of claim 6, wherein the normalized mean values of the outputs $O_i$ comprise the observation $O_N$.

8. The data evaluation method of claim 7, further comprising predicting and displaying one or more most significant parameters of the $P_k$ distinct input parameters in the $N_i$ data sets.

9. The data evaluation method of claim 1, comprising:
receiving additional data sets N+1, N+2, . . . N+k; and
re-executing the NSA using the data sets N and the additional data sets N+1, N+2, . . . N+k.

10. A non-transitory, computer-readable storage medium having encoded thereon, machine instructions executed by a processor to:
receive a plurality of N data sets, each of the N data sets comprising one or more parameters,
identify a relative contribution of one or more of the plurality of N data sets, wherein the processor:
applies a plurality of $N_i$ data sets, where i=2 . . . j . . . n, to a trained neural network and generates one or more observations O on the $N_j$ data sets, wherein the processor:
generates a Ni Network Sensitivity Analysis (NSA) curve comprising computing an observation $O_{Nj}$ with all the $N_j$ data sets, and
generates Ni-j+ NSA curve for each of a plurality of groups of multiple data sets j+, wherein j+ comprises more than one data set but less than n-1 data sets, wherein the processor:
iteratively removes each of the groups of the multiple data sets j+ from the $N_j$ data sets, and generates, using the trained neural network, an observation $O_{Ni-j+}$ with each of the groups of the multiple data sets j+ removed; and
generates a measure $M_{j+}$ of a contribution of each of the groups of the multiple data sets j+ based on the Ni NSA curve and each Ni-j+ NSA curve;
generate a relative strength $S_{j+}$ of the groups of the multiple data sets j+ as a function of the measure $M_{j+}$; and
provide the relative strength $S_{j+}$ of each of the groups of the multiple data sets j+.

11. The non-transitory, computer-readable storage medium of claim 10, wherein the measure $M_{j+}$ comprises an absolute value of a difference between the Ni NSA curve and the Ni-j+ NSA curve as an indication of the contribution of a removed group of the multiple data sets j+.

12. The non-transitory, computer-readable storage medium of claim 10, wherein the difference is a difference in areas under the Ni NSA curve and the $N_{i-j+}$ NSA curve.

13. The non-transitory, computer-readable storage medium of claim 10, wherein a group of multiple data sets comprise+ comorises g unique data sets, wherein the processor determines a relative contribution $M_g$ of each of the g unique data sets relative to the contribution $M_j$+ of the group of multiple data sets j+.

14. The non-transitory, computer-readable storage medium of claim 10, wherein the relative strength $S_{j+}$ of a group of the multiple data sets j+ is the measure $M_{j+}$ relative to a sum of measures ΣMs+ of all non-removed multiple data sets s+, wherein s+ is one or more data sets.

15. The non-transitory, computer-readable storage medium of claim 10, wherein to generate the N NSA curve and the Ni-j+ NSA curve, the processor:
establishes a relative importance of an input parameter $p_x$ in a plurality of input parameters $P_k$ in each data set $N_i$ input to the neural network, the data set $N_i$ represented by a x row by y column matrix $I_i$, an intersection of each row x with each column y defining an element x,y, the method, comprising:
for parameter $p_j$ in the plurality of parameters $P_k$ in the input data set $N_i$, the processor sorts columns $k_y$ of the matrix $I_i$, to produce a re-ordered matrix $I_{i,x}$ by reordering the columns $k_y$ such that the elements x,y in an $x^{th}$ row are arranged in order of parameter values of the parameter $p_x$,
the processor determines a hyper-parameter N* of sub-matrices $G_i$ into which may be sorted the re-ordered columns $k_y$ according to the elements x,y in the $x^{th}$ row of the re-ordered matrix $I_{i,x}$,
the processor generates a plurality of group sub-matrices $G_i$, each of the group sub-matrices $G_i$ comprising a subset of the re-ordered columns $k_y$ and the $x^{th}$ row of the group sub-matrices $G_i$, and
the processor inputs the re-ordered matrix $I_{i,x}$ into the neural network to produce outputs $O_i$, comprising sequentially imputing data input vectors, defined as the re-ordered columns $k_y$ according to positions of the re-ordered columns $k_y$ in the group sub-matrices $G_i$; and
the processor produces normalized mean values of the outputs $O_i$.

16. A method for evaluating a relative contribution of a first group of J data sets in a collection of N data sets, wherein N>J, comprising:
a processor first applying the collection of N data sets and second applying the first group of J data sets to a model and using a trained neural network, generating one or more observations O on the collection of N data sets and the first group of J data sets, comprising:
generating a N Network Sensitivity Analysis (NSA) curve comprising computing, using the trained neural network, and generating an observation $O_N$ on the collection of N data sets; and
generating a N-J NSA curve for the first group of J data sets, comprising:
removing the first group of J data sets from the collection of N data sets,
generating, using the trained neural network, an observation $O_{N-J}$ with the first group of J data sets removed, and
selecting additional groups of K data sets and repeating a process of generating N-K NSA curves and computing observations $O_{N-K}$ with one or more of the additional groups of K data sets removed from the collection of N data sets; and
generating measures $M_J$, $M_K$ of contributions of one or more of the groups of J, K data sets based on the N NSA curve and the N-J, N-K NSA curves.

17. The method of claim 16, wherein the measures $M_J$, $M_K$ are an absolute value of a difference of areas under the N NSA curves and each of the N-J, N-K NSA curves.

18. The method of claim 16, further comprising the processor receiving an additional data set Q, wherein the processor re-executes an NSA using combined data sets N and Q.

19. The method of claim 16, wherein each data set group J, K comprises an equal number of individual data sets.

* * * * *